United States Patent
Hofmeister et al.

(10) Patent No.: US 11,666,841 B2
(45) Date of Patent: Jun. 6, 2023

(54) FILTER MEDIA RIBBONS WITH NANOFIBERS FORMED THEREON

(71) Applicant: ULTRA SMALL FIBERS, LLC, Wartrace, TN (US)

(72) Inventors: William H. Hofmeister, Nashville, TN (US); Robert A. Van Wyk, St. Petersburg, FL (US); Collin Anderson, Arlington Heights, IL (US)

(73) Assignee: ULTRA SMALL FIBERS, LLC, Wartrace, TN (US)

( * ) Notice: Subject to any disclaimer, the term of this patent is extended or adjusted under 35 U.S.C. 154(b) by 87 days.

(21) Appl. No.: 17/246,929

(22) Filed: May 3, 2021

(65) Prior Publication Data

US 2021/0252440 A1  Aug. 19, 2021

Related U.S. Application Data

(63) Continuation of application No. 16/875,067, filed on May 15, 2020, now Pat. No. 11,014,029.
(Continued)

(51) Int. Cl.
*B01D 39/16* (2006.01)
*D04H 3/016* (2012.01)

(52) U.S. Cl.
CPC ......... *B01D 39/1623* (2013.01); *D04H 3/016* (2013.01); *B01D 2239/0618* (2013.01);
(Continued)

(58) Field of Classification Search
CPC .. B01D 39/1623; B01D 39/083; D04H 3/016; D04H 1/4382; D04H 1/43838; D04H 1/4391; D04H 1/70
See application file for complete search history.

(56) References Cited

U.S. PATENT DOCUMENTS 3,354,022 A   11/1967  Johnson, Jr.
5,407,737 A    4/1995  Halterbeck
(Continued)

OTHER PUBLICATIONS

Chen, et al., Flexble, Aligned Carbon Nanotube/Conducting Polymer Electrodes for a Lithium-Ion Battery, Chem. Mater. , 2007, 19, 3595-3597 (Year: 2007).
(Continued)

*Primary Examiner* — Chester T Barry
(74) *Attorney, Agent, or Firm* — Eric B. Fugett; Mark A. Pitchford; Pitchford Fugett, PLLC

(57) ABSTRACT

Nanofiber filter media ribbons are flexible elongate strips of polymeric material having a surface on which is formed an array of nanofibers. Ribbons are formable into woven or non-woven mats. The array of nanofibers can be configured to filter a predetermined contaminant from a fluid stream passing through the mats. Filter ribbons are formable by applying a moldable polymer to a first angular location of a rotating cylindrical roll having an array of nanoholes formed in a circumferential surface thereof so that the polymer covers the surface of the roll and infiltrates the nanoholes; cooling the polymer while rotating the polymer-covered roll to a second angular position; and removing the cooled polymer from the roll as an elongate film having an array of nanofibers formed on a surface thereof by the polymer that infiltrated the nanoholes.

17 Claims, 25 Drawing Sheets

Related U.S. Application Data

(60) Provisional application No. 62/852,970, filed on May 24, 2019.

(52) U.S. Cl.
CPC ............... *B01D 2239/1208* (2013.01); *B01D 2239/1233* (2013.01)

(56) References Cited

U.S. PATENT DOCUMENTS

| | | | |
|---|---|---|---|
| 8,303,693 | B2 | 11/2012 | Leung |
| 8,652,229 | B2 | 2/2014 | Ensor et al. |
| 9,012,596 | B2 | 4/2015 | Sung |
| 9,069,244 | B2 | 6/2015 | Kobrin |
| 9,817,154 | B2 | 11/2017 | Kawaguchi |
| 9,964,783 | B2 | 5/2018 | Huynh |
| 10,159,926 | B2 | 12/2018 | Hofmeister et al. |
| 2007/0031282 | A1* | 2/2007 | Zucchelli ......... G01N 35/00029 422/400 |
| 2013/0216779 | A1 | 8/2013 | Hofmeister et al. |
| 2015/0093550 | A1 | 4/2015 | Hofmeister |
| 2015/0367380 | A1 | 12/2015 | Kotov |
| 2016/0222345 | A1 | 8/2016 | Hofmeister |
| 2016/0257857 | A1 | 9/2016 | Sitti |
| 2017/0072349 | A1* | 3/2017 | Hofmeister ......... B01D 63/082 |
| 2017/0320057 | A1 | 11/2017 | Hofmeister et al. |
| 2018/0353883 | A1 | 12/2018 | Konishi |
| 2019/0314746 | A1 | 10/2019 | Leung |
| 2020/0306029 | A1 | 10/2020 | Rocco |

OTHER PUBLICATIONS

Pushparaj, et al., Flexible energy storage devices based on nanocomposite paper, Proced. Natl. Acad. Sci., Aug. 21, 2007, vol. 104, No. 34, 13574-13577, www.pnass.org_cgi_doi_10.1073_pnas. 0706508104 (Year: 2007).

Burton and Bhushan, "Hydrophobicity, Adhesion, and Friction Properties of Nanopatterned Polymers and Scale Dependence for Micro- and Nanoelectromechanical Systems," Nano Letters, 2005, vol. 5, No. 8, p. 1607-1613.

White, Y. et al., "Single-Pulse ultrafast-laser machining of high aspect nano-holes at the surface of SiO2," Optics Express, 2008, vol. 16, No. 19, pp. 14411-14420.

* cited by examiner

FILTER MEDIA RIBBONS WITH NANOFIBERS FORMED THEREON

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application is a continuation of U.S. Nonprovisional patent application Ser. No. 16/875,067, filed May 15, 2020 and entitled "FILTER MEDIA RIBBONS WITH NANOFIBERS FORMED THEREON," now U.S. Pat. No. 11,014,029, which claims priority to U.S. Provisional Patent Application Ser. No. 62/852,970, filed May 24, 2019 and entitled "Unitary Multiscale Filter Media," the entire disclosures which are hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to filter media and filter devices, and more specifically to filter media and filter devices which combine user-defined arrays of nanofibers and elongate ribbon-like elements to create filter media that provide the benefits of nanofibers in a form that can be utilized in ways similar to conventional filter media.

Fibrous filter media are used in various types of filter devices to trap large and small particles in liquid and gas streams. Such filter media are typically formed from multiple layers of coarse and fine fibers extending parallel to an upstream surface of the filter media. An outer layer of coarse fibers forms a bulk filtration layer for filtering of larger particles, while an inner or underlying layer of fine fibers provides filtering of small particles. Fine fibers are often provided in a thin layer laid down on a supporting permeable substrate or used with one or more permeable protective layers to obtain a variety of benefits, including increased efficiency, reduced initial pressure drop, cleanability, reduced filter media thickness, and to provide a selectively impermeable barrier to various liquids, such as water. However, prior approaches have several inherent disadvantages, including the need for a supporting substrate, a risk of delamination of the fine fiber layer from the substrate, more rapid loading of the filter by captured particles, the alignment of fine fibers parallel to the media face surface, and an inability to control spacings between fine fibers.

In addition to filtering mechanisms, on the molecular level, fibrous materials also trap contaminants with electrostatic forces, including ionic bonding, hydrogen bonding, and Van der Waals forces. These electrostatic interactions occur on the fiber surface. Because these interactions are known to increase non-linearly at sub-micron length (diameter) scales, functional improvement in fibrous filter media is largely based on minimizing denier (linear mass density or fiber diameter). Although the production of filter media comprising very fine fibers having a high surface-to-volume ratio, such as microfibers and nanofibers, has recently been emphasized in the industry, processing limitations associated with traditional methods of producing such fibers limit the utility of these materials in filtration applications.

The benefits realized through the use of nanofibers for filtering contaminants from a fluid stream are well known, and the technology is widely used. As currently commonly practiced, a thin layer of electrospun or melt-blown nanofibers is deposited on a porous substrate. Nanofibers deposited using these processes form a non-woven mat that lacks physical strength. This makes handling of prior art nanofiber mats without a suitable permeable substrate impractically difficult for filter manufacturing. The unique filtering properties of a nanofiber mat derive from the diameter of the nanofibers, and these properties are currently only obtainable with fibers formed into these non-woven constructs. Filter media formed of micro-fibers are easily handled during filter manufacturing, but because of their larger diameter of the fibers lack the enhanced filtering abilities of nanofibers. Accordingly, to achieve these enhanced properties in a filter, nanofibers are commonly deposited onto microfiber media in the manner previously described.

Nanofibers for prior art filter applications are commonly made by electrospinning, a method that requires the use of high voltages and a flowing polymer solution containing solvents that evaporate during production. Ensor, et al. in U.S. Pat. No. 8,652,229 describe methods for electrospinning nanofibers and forming filter elements therefrom. In the methods described, the electrospinning process requires electrical potentials in the 25 kV to 30 kV range and the close control of several process parameters. The rates of nanofiber production are low in the examples given. It is not an environmentally friendly process due to the solvents required. Electrospinning produces an interconnected web (or mat) of continuous small fibers with length to diameter ratios generally 1,000,000:1 or greater.

When forming nanofibers by electrospinning, the nanofiber materials are limited to polymers that can be mixed with a solvent to achieve the properties required for the process.

In electrospinning the fibers of a closely controlled diameter are deposited onto a substrate. The substrate may be a flat plate oriented normal to the axis of the origin of the solution stream. Alternatively, the substrate may be a rotating element with a cylindrical, conical or other radially symmetric shape, the axis of rotation being perpendicular to the axis of the solution stream. Or the substrate may be a rotating disc with the axis of rotation parallel to the axis of the solution stream. Each of these substrate forms allow the forming of fiber mats configured to achieve specific design objectives through optimizing the deposition pattern of the fibers. If translation of the substrate in a plane normal to the solution stream is added to any of the substrate configurations, the deposited fiber may be given a directionality. Indeed, the fiber mat may be formed with a predetermined pattern to achieve design objectives for a given application. Microfiber or nanofiber mats with a particular preferential orientation of the fibers are frequently referred to as "ordered", and in some cases an "ordered matrix", or "ordered construct". The "order" to which this refers, then, is that the elongate continuous fibers forming the mat do not have a random directionality, but rather have a greater portion oriented parallel to a first axis than to a second axis.

This is a two-dimensional effect only since the fiber mat forms a thin sheet, frequently membrane-like.

Prior art nanofiber mats cannot withstand tensile loading. Because nanofibers forming the mat have very low structural strength, increasing the number nanofibers does not appreciably increase the thickness of the mat, but simply creates a denser mat with decreased porosity. When the nanofiber mat manufactured by the electrospinning method is used to form an air filter, nanofibers (fibers) can be easily clogged (that is, packing can easily occur), resulting in a decrease in air permeability and an increase in pressure loss. Since clogging can easily occur, there have been problems in that the pressure loss may easily increase and the service life of an air filter may be shortened.

To address these drawbacks, Konishi, in US Application Publication No. 2018/0353883 discloses an alternate method (not electrospinning) for forming a non-woven mat of nanofibers. Konishi's method forms a mat of fibers that have a range of diameters that average less than one micron, but also that also contains fibers of larger diameters so as to give the mat increased thickness and spacing between the nanofibers. The number of fibers having fiber diameters ranging from 2 times up to 10 times the average fiber diameter of the constituent fibers is in a range of 2 to 20% of a total number of the constituent fibers. The fiber mat is deposited onto a non-woven fabric using a complex process. Although the thickness of the mat is somewhat increased, the long continuous fibers are randomly deposited in a two-dimensional construct similar to electrospun mats.

Microfibers for filters and other applications may be made by melt blowing, a fiber making process in which melted polymer is extruded through a plurality of small orifices surrounded by streams of a high velocity gas. A plurality of randomly oriented fibers are deposited onto a substrate so as to form a non-woven mat or fabric. The process does not require the use of solvents or high voltages, and the fiber deposition rates can be orders of magnitude greater than those possible by electrospinning. Melt blown fibers are generally in the range of two to five microns with a wide diameter distribution. Because the fibers are not drawn to a substrate by an electrostatic charge as in electrospinning, fiber mats formed by melt blowing are not membrane-like, but rather have fibers that are spaced one from another in the direction parallel to the blowing direction. The fibers are long and continuous with a random orientation. In some applications the mat is subsequently compressed to form a non-woven fabric. Melt blowing nanofibers is difficult since extremely small orifices are required and the molten plastic must flow through these orifices and remain in fiber form as they travel to the substrate. Surface tension in the molten fiber tends to cause the material to become droplets rather than fibers so as to reduce the surface energy. Accordingly, the polymers that can be successfully melt blown into nanofibers is limited and the process has not yet been scaled up sufficiently for commercial use. The process remains an efficient method for forming microfiber mats and non-woven fabrics for filters and other applications.

In another approach, increasing the nanofiber content of a filter is accomplished through the use of a stratified filter construction with layers of nanofibers interspersed between microfiber substrate layers.

Whether a nanofiber mat is formed by electrospinning, Konshi's method, or another means, the mat is a thin construct, frequently membrane-like. Because of this, the mat is oriented essentially normal to the flow stream direction. The density of the mat is limited by the backpressure that the filtering process can tolerate.

The beneficial effects of including nanofibers in a filter may be temporarily enhanced by electrostatically charging the nanofibers. For instance, it has been demonstrated that charging nanofiber mats interspersed between insulating separating permeable layers causes a significant increase in the filter efficiency. This is described in detail in US Application Publication No. 2019/0314746 by Leung. However, the applied electrostatic charge degrades over time so that filters of this type have a finite shelf life, making them impractical for some applications.

Polymeric materials have an inherent electrostatic charge that creates an attractive force, the force at any given point on a surface being inversely dependent on the radius of curvature of the external surface at that point. When the radius of curvature is large the electrostatic attractive force is weak. As the radius is decreased the attractive force increases, a factor exploited in nanofiber filter media. The small diameter of the nanofibers results in an attractive force that is orders of magnitude greater than that of microfibers allowing nanofibers to draw contaminant particles with greater force for removal from a fluid stream. This electrostatic charge is intrinsic to the material and does not degrade in the manner of an applied electrostatic charge.

Filters for use in personal protective equipment (PPE) may also benefit from the inclusion of nanofibers. Specifically, face masks that form a tight seal to the face, also referred to as respirators, are commonly used to prevent contaminants from entering the airway of the wearer. These devices reduce the wearer's exposure to particles including small particle aerosols and large droplets. Face masks of this type must remove contaminants while minimizing the pressure drop across the filter element. The filtering element forming the mask my also be pliable so as to allow the mask to form a seal with the face of the wearer. Typically a wearable filter of this type will have a permeable hydrophobic outer protective layer, a coarse filter media layer for removing large particulate, a fine filter medial layer for removing smaller particulate, and an inner soft permeable fabric layer for contacting the face of the wearer.

Leung in U.S. Pat. No. 8,303,693 teaches a face mask that incorporates a filtration medium a fine filter layer having a plurality of nanofibers and a coarse filter layer having a plurality of microfibers attached to the fine filter layer. Flow passes through the coarse filter to the fine filter layer. The polymer nanofibers in the fine filter layer may be obtained in a variety of ways including electrospinning or by melt-blowing. Accordingly, the nanofibers are long and continuous with a random orientation. The thickness of this nanofiber layer may have a thickness of about 0.01 to about 0.2 millimeters. Because the nanofiber fine filter layer is a thin layer, the layer may tend to clog easily and increase the resistance to air flow. The coarse and fine layers together form a "well-bonded laminate structure", the layers being bonded one to another. Indeed, it is necessary for the nanofiber layer to be bonded to the microfiber layer for handling purposes during manufacture of a filter since the nanofiber layer lacks physical strength. In one embodiment the nanofibers are deposited onto the microfiber layer during electrospinning or melt blowing so that they adhere to the microfiber layer. In another embodiment the nanofibers are deposited onto a liquid in which the microfibers are submerged so that the nanofibers are not adhered to the microfibers. When forming of a nanofiber layer is complete, the liquid is removed leaving the nanofiber layer atop the microfiber layer but not adhered thereto. The nanofiber layer and microfiber layer are then compressed mechanically together with a small amount of compatible adhesive to form a rigid structure. The manner in which Leung's layered filter assembly is formed illustrates the difficulty and limitations of forming filter assemblies incorporating electrospun and melt blown nanofibers due to their mechanical properties. As with other applications that incorporate electrospun nanofibers, the fiber making process is difficult to scale up and is environmentally undesirable due to the solvents used. The integration of nanofibers into a mask assembly is similarly difficult.

Hofmeister, et al. in U.S. Pat. No. 10,159,926 teaches media and devices for filtering or separating a contaminant from a fluid liquid or gas stream. The Hofmeister devices incorporate flow passages formed by layered laminas comprising tunable topographies of user-defined arrays of nanofibers and, optionally, nanoholes. These tunable nanofiber topographies selectively remove contaminants from the fluid stream as it flows through spaces between adjacent laminas, parallel to the surface of the laminas, with at least one of these surfaces having nanofibers formed thereon. Contaminants are drawn to the nanofibers by electrostatic forces in the manner previously described. Nanofiber filters constructed in accordance with the Hofmeister patent can be tuned to remove specific contaminants such as pathogens, chemical contaminates, biological agents, and toxic or reactive compounds from a fluid to be filtered by selecting a suitable nanofiber diameter, height, distance between nanofibers, interlaminar gap and material.

The Hofmeister filter construction requires a rigid housing to maintain the orientation and alignment of the laminas making up the filter so that a continuous flow path is created between an inlet and outlet formed in the housing, the flow passing through interlaminar spaces formed therein.

Accordingly applications for the Hofmeister filter with its tuned topography are limited to those in which the fluid stream is directed through spaces formed between adjacent, aligned laminas, the alignment being maintained by a rigid housing structure. Because of this, the benefits of filter elements comprising a tuned topography formed of nanofiber arrays cannot be realized in filtering devices that do not/cannot include a rigid housing and flow between adjacent parallel laminas.

There is a need for filter media that exploit the inherent electrostatic properties of nanofibers in optimized configurations that do not require a rigid housing and laminar construction. Such media are the subject of this invention.

Accordingly, it is an object of the present invention to provide nanofiber filter media that can withstand tensile loading.

It is also an object of the present invention to provide nanofiber filter media that achieve high collection efficiency and reduced clogging (packing) between fibers.

It is also an object of the present invention to provide nanofiber filter media that does not require deposition on a substrate during manufacture.

It is also an object of the present invention to provide nanofiber filter media wherein the nanofibers are configured to optimally exploit the electrostatic properties of the nanofibers.

It is also an object of the present invention to provide nanofiber filter media wherein the nanofibers cannot be easily expelled from the filter media.

It is also an object of the present invention to provide nanofiber filter media wherein the nanofibers are integrated in a heterostructure containing nanofibers and support.

It is further an object of the present invention to provide nanofiber filter media at lower cost than current nanofiber media.

It is further an object of the present invention to provide nanofiber filter media that may be produced without the need for high voltages or environmentally detrimental solvents.

It is also an object of this invention to provide a method for increasing the wettability of a fluid on a surface of filter media through the formation of nanofibers on one or more surfaces of the media.

It is further an object of this invention to provide a method for decreasing the wettability of a fluid on a surface of filter media through the formation of nanofibers on one or more surfaces of the media.

It is an object of this invention to provide a method of selectively increasing the wettability of a surface of a filter media for a first flow stream component while decreasing the wettability for a second flow stream component.

It is finally an object of this invention to provide nanofiber filter media that can remove biological contaminants including viruses from an air stream

BRIEF SUMMARY

These and other objects are achieved in devices and methods of the present invention which addresses filter media, filtering devices formed therefrom, and methods for their use wherein the filter media is formed of flexible, elongate ribbon-like polymeric elements having arrays of nanofibers formed thereon. These ribbon elements and ribbon segments may be formed by cutting, slicing, chopping, or slitting elongate film elements on which are formed nanofiber arrays. Ribbons so formed have a planar portion of predetermined thickness and width that may be formed to other non-planar shapes in subsequent processing. These media ribbons may also be formed by embossing of the nanofiber arrays on monofilament fibers as well as on woven and non-woven fiber assemblies. Devices and methods of the present invention are not limited by the method of manufacture of the elongate ribbon-like elements.

The elongate ribbons of filter media of the present invention are formed of a suitable polymeric film, have a flexible planar portion of predetermined thickness and width, and have an array of nanofibers formed on at least one surface of the film. In a preferred embodiment the nanofibers are arranged in rows spaced a first distance apart, with the nanofibers within each row spaced a second distance apart. In some embodiments the first and second distances are equal. In others they are not. The diameter of each nanofiber generally decreases along the nanofiber's length from a first diameter at its base, and the lengths of the fibers in an array fall within a predetermined range. The form of a fiber is largely determined by the ratio of the length of the fiber to its diameter. At low ratios the fiber may have a post-like appearance, while at high ratios the fiber may be tendrilous. Between these extremes is a continuum of nanofiber configurations that share the common characteristic of decreasing diameter over their finite length. Because the electrostatic force at a point on a surface is inversely related to the radius of curvature of the surface at that point, the electrostatic force on a nanofiber of filter media of the present invention is not constant along its length. The electrostatic force increases with the distal reduction in diameter, reaching its maximum at the fiber's distal end. In certain embodiments the ends of the nanofibers are configured to further enhance the electrostatic potential. The electrostatic force of nanofibers formed on ribbon media of the present invention has maximal intensity at the distal portions of the nanofibers—the portion that is most exposed to the fluid stream. This concentration results in much higher attractive forces to contaminants in the fluid stream than the uniform-diameter, continuous fibers of non-woven nanofiber mats previously herein described and currently in use in filter applications. Because of this, nanofiber arrays formed on filter ribbons of the present invention are able to draw contaminants from a flow stream with higher field gradients than other, prior art, nanofiber filter elements.

As with suitably constructed prior art filters, an electrostatic charge may be imparted to the filter media of the present invention to increase the attractive force of the nanofiber arrays formed on ribbons. In certain embodiments, filter ribbons of the present invention are formed from a polymer or polymer blend with suitable electret properties. Among these materials are polypropylene, poly(phenylene ether) (PPE) and polystyrene (PS) and others. In certain embodiments these ribbons have a lamellar construction wherein a first layer on which are formed nanofiber arrays of the present invention is bonded to a second layer with optimal physical and/or electrical properties, the first layer being formed of a suitable electret material. Charging of the media may be accomplished by corona discharge, triboelectrification, polarization, induction, or another suitable method. The imparted electrostatic charge may be dissipated by particle loading, and/or by quiescent or thermal stimulation decay.

In certain embodiments filter media ribbons of the present invention are formed of an antimicrobial plastic. One such material, MICROBAN® by Microban, Inc. (Huntersville, N.C.) is a synthetic polymer material containing an integrated active ingredient which makes it effective against microbial growth. In certain embodiments these ribbons have a lamellar construction wherein a first a layer on which are formed nanofiber arrays of the present invention is bonded to a second layer with optimal physical properties, the first layer being formed of a antimicrobial plastic. Antimicrobial agents may be blended with polymers with optimal properties for forming nanofiber arrays in methods herein described to create filter ribbons of the present invention that not only have the ability to efficiently remove microbes from a fluid stream, but also to kill those microbes.

The non-random placement of nanofiber tips in a nanofiber array represents a significant enhancement over nanofiber structures produced by other methods, such as electrospinning, because each fiber forming an array of nanofibers described herein has an independent "end" or "tip." The "ends" or "tips" of the nanofibers have stronger field gradients than the body of the fibers because gradients are enhanced with curvature and the curvature is highest at the tip. Thus, the use in filter devices of nanofiber arrays having millions of tips per square centimeter of lamina surface preserves and enhances the local fiber field gradient far better than traditional fibrous filter media and devices which rely on layered mats of fibers laid down on a substrate.

Because the electrostatic forces are generated by nanofibers formed on the surface of media ribbons of the present invention, the width and thickness of the ribbon on which the nanofiber arrays are formed may be selected based on physical strength, handling, flow or other factors since it does not affect the electrostatic properties of the nanofibers formed thereon. Because the ribbons have appreciable physical strength, structures formed of them may be handled independent of a substrate, and indeed, make practical woven and non-woven mats that may be incorporated in a wide range of filter configurations. Non-woven mats formed of the ribbons may be integrated into a single assembly by bonding of the ribbons one to another using a suitable bonding method. For applications in which the filter must flexibly conform to an external surface, a non-woven mat of bonded or loose ribbons may be positioned between first and second porous or permeable sheet materials and secured there by fastening means between the porous sheets. The sheets may be joined by stitching, needling or other mechanical means, thermal bonding, chemical bonding or other suitable joining method. In a preferred embodiment a quilted assembly is formed by the permeable sheets and the nanofiber mat positioned therebetween, stitching serving to maintain the positions of the elements. In a preferred embodiment one or both of the permeable sheets are formed of filter media. In a preferred embodiment one or both sheets themselves incorporate nanofiber arrays so as to impart specific wettability properties. For instance, a permeable sheet may be nominally wetted by a first selected liquid or vapor while nominally not wetted by a second selected liquid or vapor. Filter media ribbons of the present invention may be weaved to create flexible filter structures. Individual ribbons may be weaved to form the structure, or the ribbons may be formed into a yarn prior to weaving. The tightness of the yarn and of the woven structure may be optimized to achieve desired flow characteristics.

Elongate ribbons of the present invention with the nanofibers formed thereon may be subsequently processed in the same manner as other conventional fibrous media. Because of this, nanofiber filter media of the present invention may be formed into or integrated into filter elements at much lower cost and with much greater design flexibility than prior art, conventionally formed nanofibers made by electrospinning or other similar process.

While prior art nanofiber mats formed by electrospinning or other methods form a thin, membrane-like structure, mats formed of filter ribbons of the present invention are three-dimensional constructs. Ribbons may be piled on top of other ribbons to create mats of a desired thickness, or may fill a cavity through which the fluid stream flows. Mats formed of filter media ribbons of the present invention are flexible and resilient. Their pliable nature and low resistance to fluid flow make mats of the present invention ideally suited for use in personal protective filtering devices used in medical and industrial applications.

A respirator mask of the present invention has a layered filter construct includes filter ribbons of the present invention and benefits from the unique properties of the ribbons. A first, external (distal) layer is a thin woven or non-woven mat (fabric) formed of filter ribbons of the present invention, the ribbons being made of a hydrophobic polymeric material. On a surface of each of these ribbons are formed arrays of nanofibers configured to optimally increase the hydrophobic characteristics of this exterior fabric. Proximal to this first layer is a second layer formed of microfibers configured to remove large particulate. Optionally this second layer may also contain nanofiber bearing filter ribbons of the present invention with the nanofiber arrays configured to optimally remove contaminants of a first composition or size. Proximal to this second layer is positioned a third layer. This layer is a non-woven mat formed of nanofiber bearing filter ribbons of the present invention. Because the ribbons from which this layer are formed have structural strength, the non-woven mat has a predetermined thickness and flow characteristics selected for optimal removal of contaminants while preserving airflow at low pressure drop and resistance to clogging. The arrays of nanofibers on these ribbons are optimally configured for the removal of small particles. In certain embodiments nanofiber arrays of ribbons forming this third layer may be configured to preferentially remove specific contaminants. Indeed, additional layers of ribbon mats of the present invention may be positioned proximal to this third layer, the nanofiber arrays of each layer being optimized to remove specific contaminants. Proximal to the previously described filter layers is a permeable fabric, woven or non-woven that may, in some embodiments, be comfortably pressed against the face of the wearer. In production, the layers forming the filter assembly may be produced as continuous sheets of material, laid up in the proper order, and maintained in their relative position. Elements of the construct may be fastened together in selected locations thermally, by a glue or solvent bonding, by stitching, or by needle punch, a joining method for non-woven fabrics. Because nanofibers of the present invention are integrally formed on the surface of ribbons of the present invention, the nanofibers cannot become loose and be inhaled by the wearer as is possible with respirators made with prior art filter assemblies.

In certain embodiments the film portion of nanofiber media ribbons of the present invention remain smoothly, flexibly planar or curvilinear depending on forces applied thereto. In other embodiments the film portion may be crinkled, that is, may have wrinkles or ripples formed therein so as create flow spaces between ribbons when they are assembled into a woven or non-woven mat. Alternatively, a ribbon may be twisted so as to ensure that there are flow spaces between adjacent ribbons in a mat. While heretofore nanofiber media have been described with reference to elongate ribbons, in certain embodiments, the ribbons are chopped into short segments prior to forming a bed of loose or bonded ribbons for integration into a filter assembly.

The orientation of media ribbons of the present invention relative to the fluid stream in a filter assembly may be random or may have a degree of preferential orientation. That is, the ribbon surfaces with nanofiber arrays formed thereon may be randomly presented to the fluid flow, or may be oriented so that preferentially the surfaces primarily face the oncoming flow, or are primarily oriented parallel to the flow direction.

Filter media ribbons of the present invention with their nanofiber arrays are formed without the use of solvents or high voltage. Specifically, nanofiber arrays of the present invention are formed in a casting process in which a suitable polymer heated to a temperature sufficient to allow flow, is extruded onto a first surface of a mold with an array of nanoholes formed therein, and subsequently flows into the nanoholes of the mold. A surface of a second compressing or quenching element may be used. Subsequently, the polymeric material is cooled sufficiently so that when the compressing element is removed, the polymer with the attached molded nanofibers can be stripped from the mold surface. The result is a planar polymeric film portion with an array of nanofibers integrally formed on a first surface thereof, the form of the nanofiber array being complementary to nanohole array in the mold. The first surfaces of the mold and compressing element may be planar with the polymeric material introduced therebetween as a film prior to heating and material flow into the mold nanoholes. Alternatively, the mold and second element may be rotating cylinders, the polymer in molten form being introduced onto the circumferential surface of the mold, and subsequently compressed between the mold and the cylindrical surface of the second element. This compression enhances the cooling the material so that it can be subsequently peeled from the mold. Whether formed in discrete segments as when using a mold of planar geometry, or formed as elongate strips using the rotating cylindrical mold, the resulting film with arrays of integral nanofibers formed thereon may be cut, slit, chopped or otherwise divided into filter media ribbons of the present invention.

In some embodiments the filter media ribbons are formed of a single polymeric material. Others have a layered construction comprising two or more polymeric materials that together give the filter ribbons an optimal combination of filtering properties for a given application, and physical properties for manufacture of the ribbons. For instance, nanofiber arrays of a first material may be laminated to a film of a second material with optimal mechanical properties that is formed separately. In a variation of the previously described casting method for producing film whereon are formed arrays of nanofibers, rather than applying molten polymer to the mold, a polymer film is applied to the mold. The film is then heated to a temperature sufficient to melt or sufficiently soften the material so as to allow the material to flow into nanoholes in the mold. The surface of a compressing element may increase flow of the material into the nanoholes. The polymer is then cooled sufficiently to allow the film with nanofibers formed thereon to be stripped from the mold. As with the previously described casting process, nanofiber bearing films for fiber ribbons of the present invention formed using this method may have a layered construction, a second film being compressed against the first, nanofiber forming film by the compressing element so that the films are bonded one to another Numerous other objects, advantages and features of the present disclosure will be readily apparent to those of skill in the art upon a review of the following drawings and description of exemplary embodiments.

BRIEF DESCRIPTION OF THE DRAWINGS

Non-limiting and non-exhaustive embodiments are described with reference to the following figures, wherein like reference numerals refer to like parts throughout the various drawings unless otherwise specified. In the drawings, not all reference numbers are included in each drawing, for the sake of clarity.

DETAILED DESCRIPTION

Figure 1A:
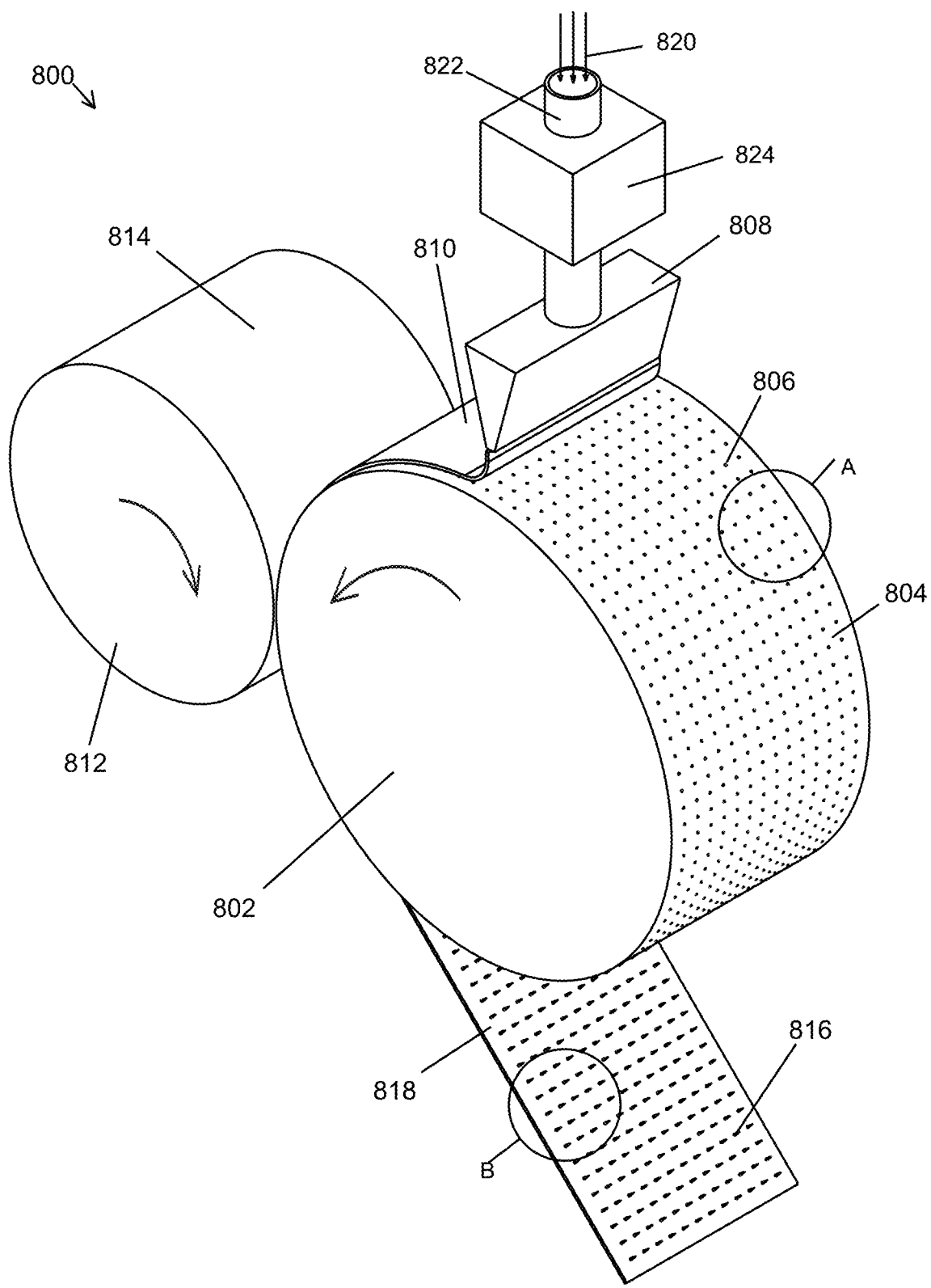
FIG. 1A is a perspective schematic representation of a chill roll casting system for making nanofiber filter elements of the present invention.
Figure 1B:
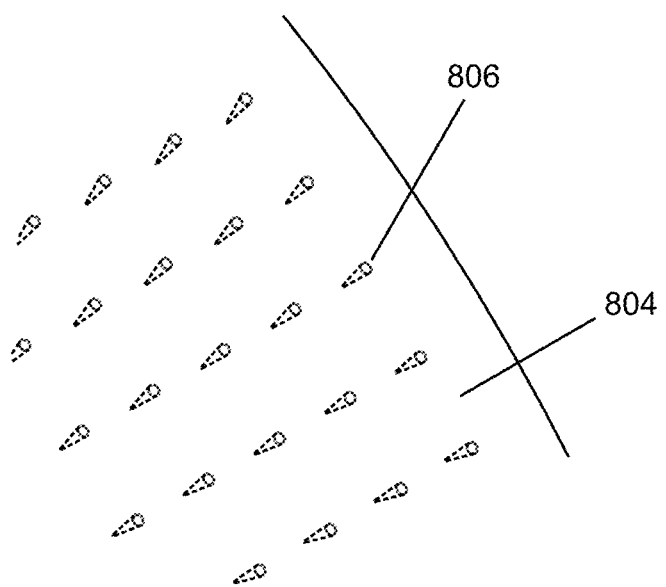
FIG. 1B is an expanded view of the objects of FIG. 1A at location A.
Figure 1C:
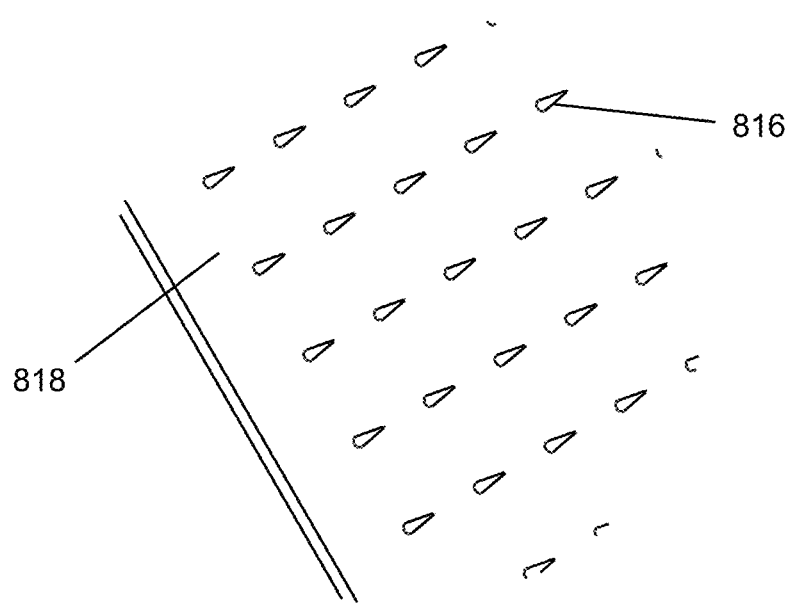
FIG. 1C is an expanded view of the objects of FIG. 1A at location B.
Figure 1D:
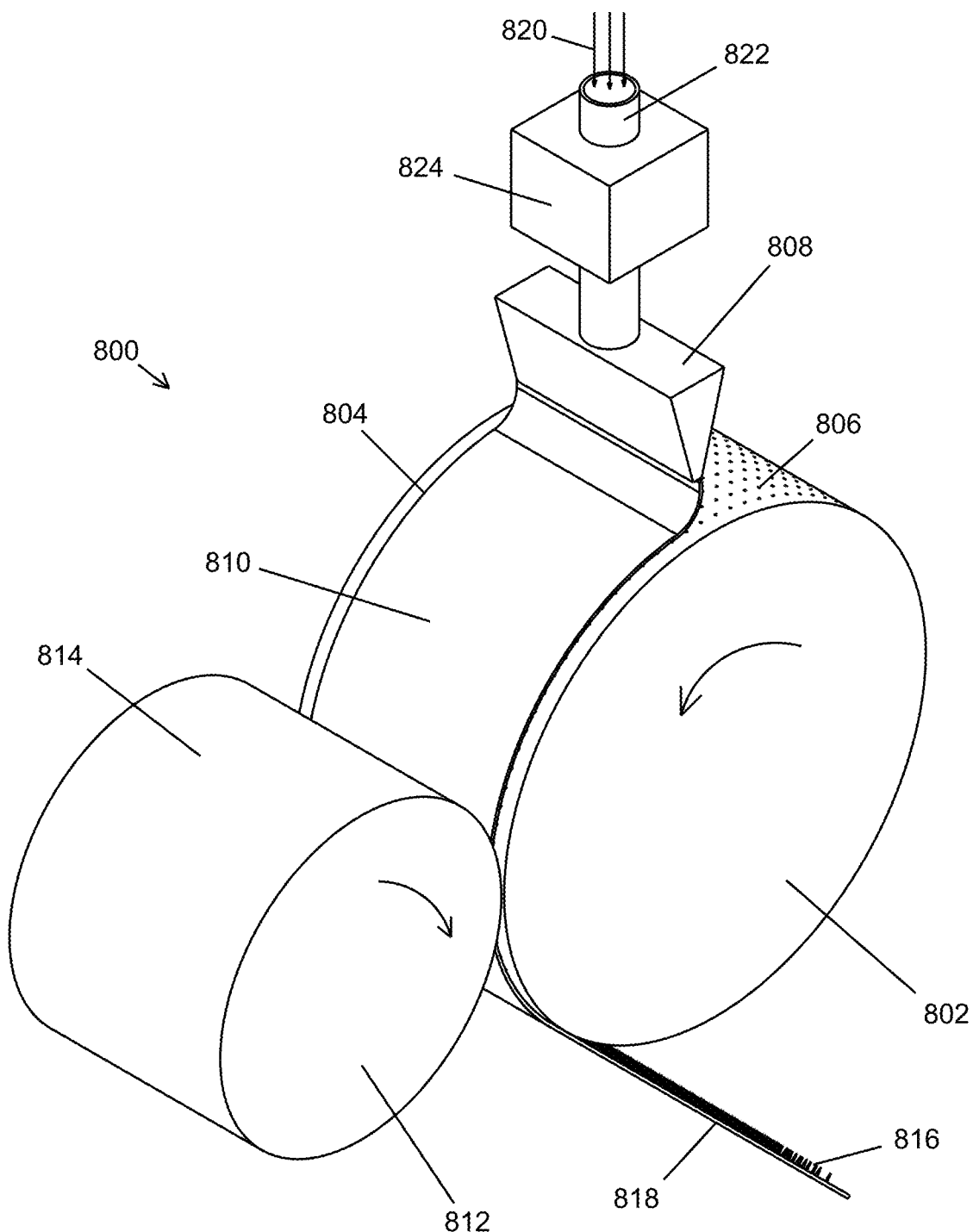
FIG. 1D is a second perspective schematic representation of the chill roll casting system of FIG. 1A.
Figure 2A:
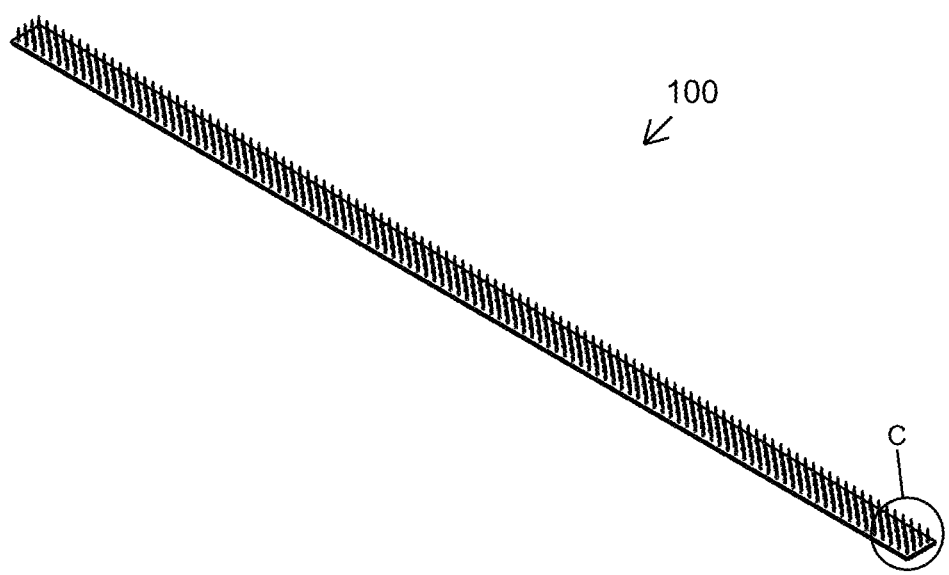
FIG. 2A is a perspective view of a ribbon element of nanofiber filter media of the present invention.
Figure 2B:
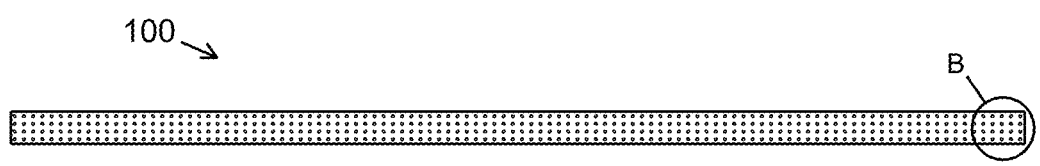
FIG. 2B is a plan view of the objects of FIG. 2A.
Figure 3:
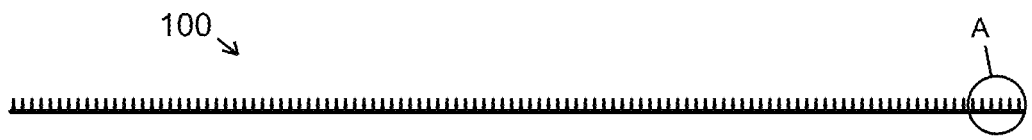
FIG. 3 is a side elevational view of the objects of FIG. 2A.
Figure 4:
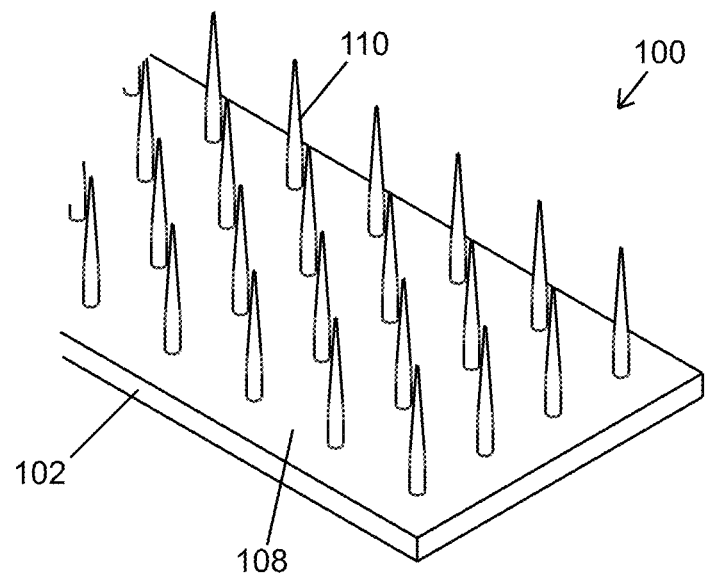
FIG. 4 is an expanded view of the objects of FIG. 2A at location C.
Figure 5:
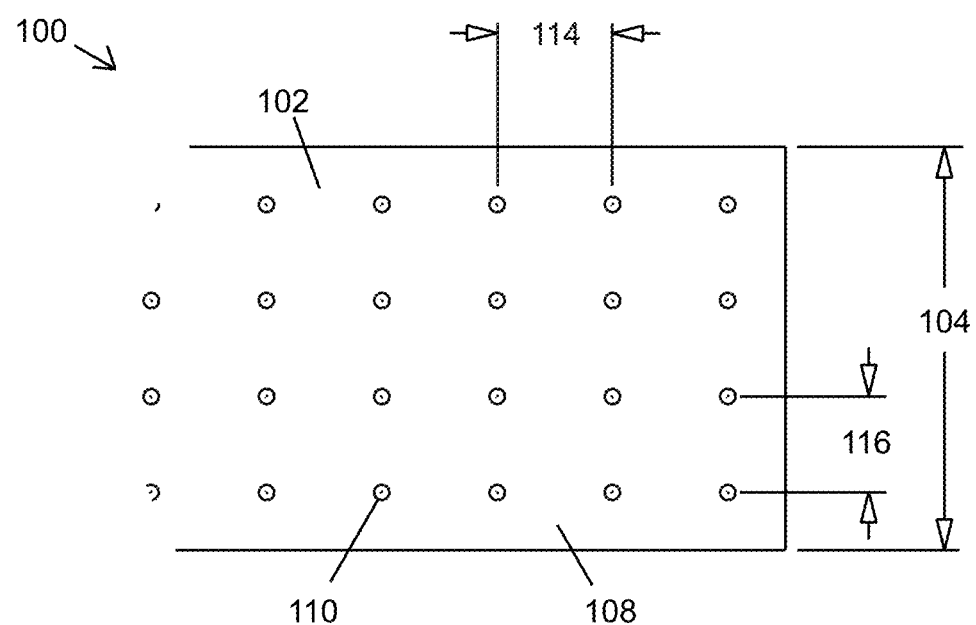
FIG. 5 is an expanded view of the objects of FIG. 2B at location B.
Figure 6:
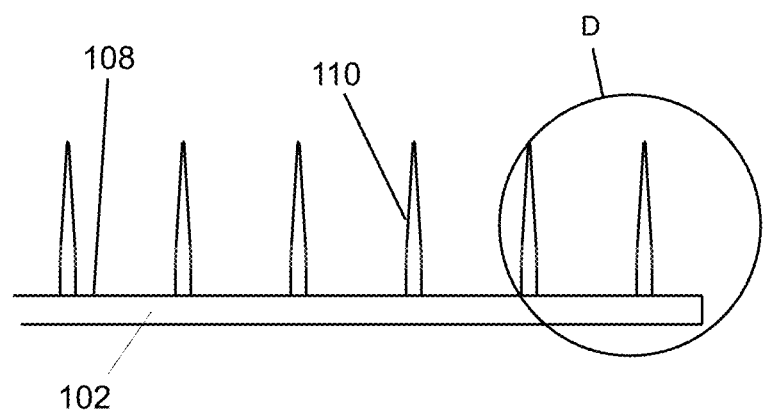
FIG. 6 is an expanded view of the objects of FIG. 3 at location A.
Figure 7:
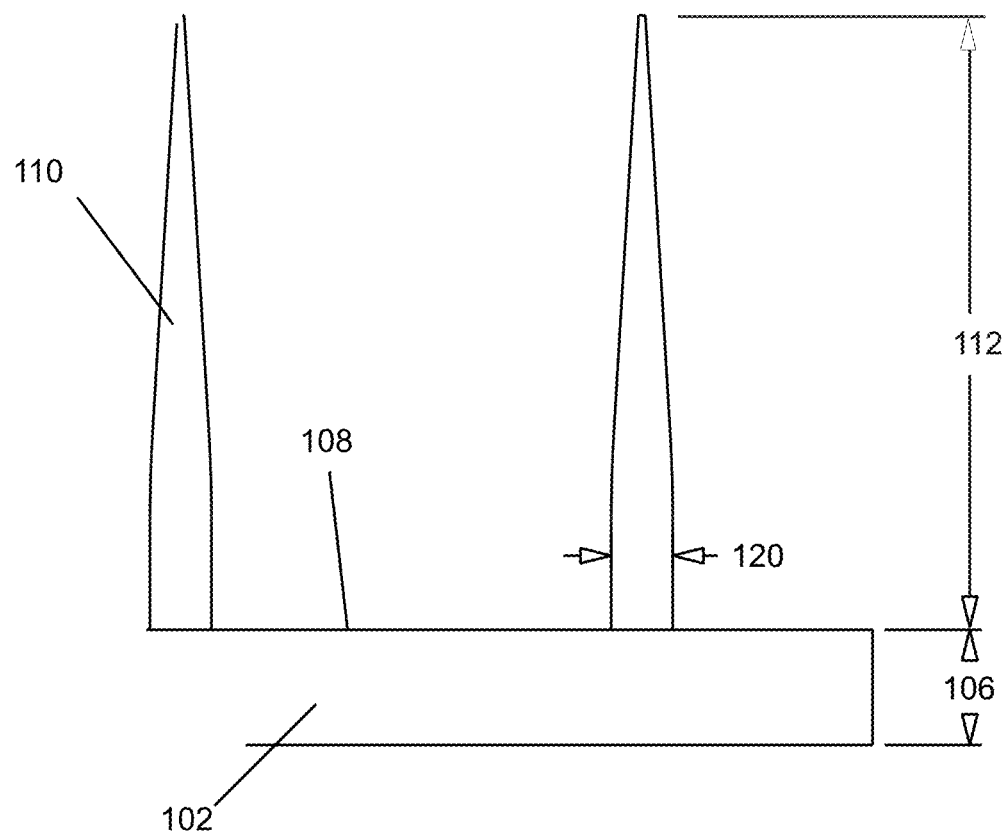
FIG. 7 is an expanded view of the objects of FIG. 6 at location D.

The details of one or more embodiments of the presently disclosed subject matter are set forth in this document. Modifications to embodiments described in this document, and other embodiments, will be evident to those of ordinary skill in the art after a study of the information provided herein. The information provided in this document, and particularly the specific details of the described exemplary embodiments, is provided primarily for clearness of understanding and no unnecessary limitations are to be understood therefrom. In case of conflict, the specification of this document, including definitions, will control.

The present disclosure relates to filter media and devices for removing a contaminant from a fluid stream. In a general embodiment, the nanofiber filters disclosed herein are designed to filter a substance or contaminant from a fluid stream using one or more user-defined arrays of nanofibers, such as those described in U.S. 2013/0216779 which is incorporated herein by reference in its entirety.

While the terms used herein are believed to be well understood by one of ordinary skill in the art, definitions are set forth herein to facilitate explanation of the subject matter disclosed herein.

Unless defined otherwise, all technical and scientific terms used herein have the same meaning as commonly understood by one of ordinary skill in the art to which the subject matter disclosed herein belongs. Although any methods, devices, and materials similar or equivalent to those described herein can be used in the practice or testing of the presently disclosed subject matter, representative methods, devices and materials are now described.

The terms "a", "an", and "the" refer to "one or more" when used in this application, including the claims. Thus, for example, reference to "a contaminant" includes a plurality of particles of the contaminant, and so forth. The use of the word "a" or "an" when used in conjunction with the term "comprising" in the claims and/or the specification may mean "one," but it is also consistent with the meaning of "one or more," "at least one," and "one or more than one."

All references to singular characteristics or limitations of the present disclosure shall include the corresponding plural characteristic(s) or limitation(s) and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and devices of the present disclosure, including components thereof, can comprise, consist of, or consist essentially of the essential elements and limitations of the embodiments described herein, as well as any additional or optional components or limitations described herein or otherwise useful.

This description and appended claims include the words "below", "above", "side", "top", "bottom", "upper", "lower", "when", "upright", etc. to provide an orientation of embodiments of the invention to allow for proper description of example embodiments. The foregoing positional terms refer to the apparatus when in an upright orientation. A person of skill in the art will recognize that the apparatus can assume different orientations when in use. It is also contemplated that embodiments of the invention may be in orientations other than upright without departing from the spirit and scope of the invention as set forth in the appended claims. Further, it is contemplated that "above" means having an elevation greater than, and "below" means having an elevation less than such that one part need not be directly over or directly under another part to be within the scope of "above" or "below" as used herein.

The phrase "in one embodiment," as used herein does not necessarily refer to the same embodiment, although it may. Conditional language used herein, such as, among others, "can", "might", "may", "e.g.," and the like, unless specifically stated otherwise, or otherwise understood within the context as used, is generally intended to convey that certain embodiments include, while other embodiments do not include, certain features, elements and/or states.

Unless otherwise indicated, all numbers expressing physical dimensions, quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently disclosed subject matter.

As used herein, the term "about," when referring to a value or to an amount of mass, weight, time, volume, concentration, percentage or a physical dimension such as length, width, or diameter, is meant to encompass variations of in some embodiments +−40% or more, in some embodiments +−20%, in some embodiments +−10%, in some embodiments +−5%, in some embodiments +−1%, in some embodiments +−0.5%, and in some embodiments +−0.1% from the specified value or amount, as such variations are appropriate to perform the disclosed methods.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "fluid" is defined as any liquid or gas which can be passed through the filter media and filter devices disclosed herein. Multiple fluids having different specific gravities and viscosities can be used as well as gas and vapor streams, depending on the application.

As used herein, the term "nanofiber" refers to a fiber structure having a diameter of less than 1000 nanometers for more than half the length of the structure. In some embodiments, the nanofibers disclosed herein can comprise a tapered base portion and a relatively longer fiber portion which extends from the base portion. In such embodiments, the fiber portion has a diameter of less than 1000 nm and a length greater than that of the base portion, and the base portion can have a diameter of from about 10 micron to less than 1.0 micron. Additionally, in some embodiments, the base portion can also have a length of from about 1.0 micron to about 10 microns, and the fiber portion can have a length of from about 10 to 100 times greater than the length of the base portion. Nanofibers having larger diameter base portions in the range of from about 2.0 microns to about 10 microns are best suited for applications wherein the bases must provide stiffness to the nanofiber in the fluid stream.

In some preferred embodiments, nanofibers suitable for use in the nanofiber filter media and filter devices disclosed herein can have an overall length of from about 10 to about 100 microns. Accordingly, suitable nanofibers can also have a length to diameter ratio of from 10:1 to about 1000:1. In one embodiment, the length to diameter ratio is from about 10:1 to about 100:1. By contrast, nanofibers known in the art, including electrospun nanofibers, melt-blown nanofibers and microfiber-derived nanofibers (i.e., microfibers split during processing to obtain sub-micron diameter structures), typically have much greater length to diameter ratios in the range of 1,000,000:1 to 100,000,000:1. As a result, the nanofibers used in nanofiber filter media and filter devices disclosed herein can have from about 10 to about 1000 times more tips per unit length than electrospun nanofibers, melt blown nanofibers and microfiber derived nanofibers.

The related terms "nanofiber array" and "array of nanofibers," which are used interchangeably herein, collectively refer to a plurality of freestanding nanofibers of user-defined physical dimensions and composition integrally formed on and extending from a backing member, such as a film, according to user-defined spatial parameters. In some embodiments, the nanofiber arrays disclosed herein include nanofibers which extend from a surface of the backing member at an angle substantially normal to a plane containing the surface of the backing member from which the nanofibers extend. By contrast, electrospun nanofibers, melt-blown nanofibers, and microfiber-derived nanofibers are neither integrally formed on nor do they extend from a backing member.

User-tunable physical characteristics of the nanofiber arrays disclosed herein include fiber spacing, diameter (also sometimes referred to herein as "width"), height (also sometimes referred to herein as "length"), number of fibers per unit of backing member surface area (also referred to herein as "fiber surface area density"), fiber composition, fiber surface texture, and fiber denier. For example, nanofiber arrays used in the filter media and filter devices disclosed herein can comprise millions of nanofibers per square centimeter of backing member, with fiber diameter, length, spacing, material composition, and texture configured to perform a filtration function. In some embodiments, one or more of fiber surface area density, diameter, length, spacing, composition, and texture are controlled and optimized to perform a filtration function. In certain embodiments, the nanofiber arrays can be optimized or "tuned" to perform a specific filtration function or target a preselected substance or specific retentate. In further embodiments, an array of nanofibers disposed on a portion of a filter lamina forming a flow passage of a filter device disclosed herein is configured to filter a substance from a fluid containing the substance when the fluid is flowed through the flow passage.

The nanofiber arrays disclosed herein, when formed on a substantially planar surface of a backing member, can include nanofibers spaced along an X-axis and a Y-axis at the same or different intervals along either axis. In some embodiments, the nanofibers can be spaced from about 100 nm to 200 micron or more apart on the X-axis and, or alternatively, the Y-axis. In certain embodiments, the nanofibers can be spaced from about 1 micron to about 50 micron apart on one or both of the X-axis and the Y-axis. In a preferred embodiment, the nanofibers can be spaced from about 2 micron to about 7 micron apart on one or both of the X-axis and the Y-axis.

In some embodiments, an array of nanofibers can include nanofibers having an average length of at least 25 micron. In certain embodiments, the nanofibers can have a length of from about 10 micron to about 100 micron. In certain embodiments, the nanofibers can have a length of from about 15 micron to about 60 micron. In an exemplar embodiment, the nanofibers can have an average length of from about 20 micron to about 30 micron. In specific embodiments, the nanofibers can have a length of about 15.00 micron, 16.00 micron, 17.00 micron, 18.00 micron, 19.00 micron, 20.00 micron, 21.00 micron, 22.00 micron, 23.00 micron, 24.00 micron, 25.00 micron, 26.00 micron, 27.00 micron, 28.00 micron, 29.00 micron, 30.00 micron, 31.00 micron, 32.00 micron, 33.00 micron, 34.00 micron, 35.00 micron, 36.00 micron, 37.00 micron, 38.00 micron, 39.00 micron, 40.00 micron, 41.00 micron, 42.00 micron, 43.00 micron, 44.00 micron, 45.00 micron, 46.00 micron, 47.00 micron, 48.00 micron, 49.00 micron, 50.00 micron, 51.00 micron, 52.00 micron, 53.00 micron, 54.00 micron, 55.00 micron, 56.00 micron, 57.00 micron, 58.00 micron, 59.00 micron, or 60.00 micron.

The nanofiber backing member surface area density can range from about 25,000,000 to about 100,000 nanofibers per square centimeter. In some embodiments, the nanofiber surface area density can range from about 25,000,000 to about 2,000,000 nanofibers per square centimeter. In specific embodiments, the nanofiber surface density is about 6,000,000 nanofibers per square centimeter. In an exemplar embodiment, the nanofiber surface area density is about 2,000,000 nanofibers per square centimeter.

In some embodiments, an array of nanofibers can include nanofibers having an average denier of from about 0.001 denier to less than 1.0 denier. In an exemplar embodiment, the nanofibers forming a nanofiber array disclosed herein can be less than one denier and have a diameter ranging from about 50 nm to about 1000 nm.

Nanofiber arrays and methods for producing nanofiber arrays suitable for use in the filter media and filter devices disclosed herein are described by the present inventors in U.S. 2013/0216779, U.S. 2016/0222345, and White et al., Single-pulse ultrafast-laser machining of high aspect nanoholes at the surface of SiO2, Opt. Express. 16:14411-20 (2008), each of which is incorporated herein by reference in its entirety.

A preferred method for manufacturing herein described ribbons and ribbon segments of the present invention with nanofiber arrays for filter elements of the present invention is hot pressing, a method in which a suitable polymeric film is positioned between a temperature controlled compressing plate and a substrate/mold formed of silica or another suitable material in which patterns of nanoholes have been formed, the pattern of the nanoholes being complementary to the pattern of nanofibers to be produced. Methods for making molds with patterns of nanoholes formed therein by single-pulse femto-second laser machining are described in detail in US 2015/0093550, herein incorporated by reference in its entirety. The compressing plate, mold and film are heated to a predetermined temperature and a force is applied to the compressing plate so as to press the film against the silica mold. When the temperature of the film material reaches a sufficient level, the softened film material flows into the nanoholes in the mold. In some embodiments with certain materials the softened polymer infiltrates the nanoholes due to surface tension effects only. In other embodiments with films formed of the same or different materials, infiltration of the nanoholes is accomplished by a combination of hydrostatic pressure and surface tension. Thereafter the system is cooled sufficiently to allow the film to be peeled off of the substrate with the molded nanofibers attached to its first surface. The hot-pressing method for producing filter ribbons with nanofiber arrays is described in detail by Hofmeister, et al. in US 2016/0222345, herein incorporated by reference. While hot pressing is a preferred method for forming ribbons for filters of the present invention, solution casting may also be used. The solution casting method for producing filter ribbons with nanofiber arrays is described in detail by Hofmeister, et al. in US 2015/0093550.

Another preferred method for manufacturing ribbons of the present invention has the ability to produce continuous elongate strips of film with arrays of nanofibers formed on at least one surface thereof. In method 800, a variation of a film producing technique referred to as "chill roll casting" and depicted in FIGS. 1A through 1D, polymer 820 is supplied via tubular member 822 to extrusion head 808. Polymer 820 is heated above its melt point by heater 824 and the melted polymer 810 is then applied to rotating cylindrical roll 802 (referred to as a "chill roll") formed of silica or another suitable material. An array of nanoholes 806 is formed in the circumferential surface 804 of roll 802 so as to form a mold, the nanohole array being complementary to the array of nanofibers to be formed. The nanoholes are formed using methods previously described herein. Molten polymer 810 flows into nanoholes 806 as it is applied to circumferential surface 804 of rotating chill roll 802. Chill roll 802 is maintained at a temperature such that during a predetermined portion of the roll rotation of chill roll 802, polymer 810 in nanoholes 806 solidifies along with the portion of polymeric material 810 coating circumferential surface 804 of roll 802. A cylindrical metallic roll 812, commonly referred to as a "anvil roll" or "quench roll" functions as the compressing element and is positioned adjacent to chill roll 802 such that after a predetermined angular rotation of chill roll 802 polymeric material 810 coating the surface of chill roll 802 is compressed between surface 804 of chill roll 802 and surface 814 of the quench roll 812. As implied by the name "quench roll" polymeric material 810 undergoes rapid cooling during contact with quench/anvil roll 812 so that it may be subsequently stripped from the surface of chill roll 802 as a continuous elongate strip of film 818. When the polymer strip 818 is removed from chill roll 802, material 810 that had previously flowed into nanoholes 806 forms molded nanofibers 816 on the surface of film strip 818. In subsequent processing elongate strips 818 may be slit, cut, chopped or otherwise formed into filter ribbons of the present invention. As with the previously described hot pressing method, polymer 820 is not contained in a solution so the use of environmentally undesirable solvents is not required.

Under certain conditions, with suitable polymers, quench roll 812 is eliminated. The thickness of film strip 818 is determined by process parameters. These may include properties of polymer 820, the temperature of polymer 810 as it is deposited on surface 804 of chill roll 802, the temperature and rotational speed of chill roll 802, and other factors that affect the cooling of film strip 818. Under these conditions, material is drawn into nanoholes 806 of surface 804 of chill roll 802 by surface tension.

In the methods of manufacture previously herein described, reference is made to molds made of silica or another suitable material. Among these suitable materials are transparent materials like borosilicate glass, soda lime glass, BK7 optical glass, plastic, single-crystal quartz, diamond and sapphire. All have been successfully micromachined with femtosecond laser pulses. Fused silica is a preferred material since it offers a combination of properties like wide range of spectral transparency, low autofluorescence, good biocompatibility, chemical inertness, near zero thermal expansion, excellent thermal shock resistance, and low dielectric constant and losses.

Any alternate method capable of producing integral arrays of nanofibers of predetermined lengths, diameters, and profiles formed on a surface of a film and substantially perpendicular to a first surface of a film, and further, wherein the spatial arrangement of the fibers has a predetermined pattern, may be used. All fall within the scope of this invention.

Using the foregoing methods, nanofiber arrays with a variety of mechanical, electrical and chemical properties, Debye moments, tailored affinities, and functional binding sites can be produced from almost a wide variety of polymers without the use of solvents or high voltage electrical fields.

Nanofibers forming nanofiber arrays disclosed herein can be composed of virtually any thermoplastic polymer, polymer resin, or similar material. Non-limiting examples of suitable polymers include poly(.epsilon.-caprolactone) (PCL), polyethylene oxide (PEO), polyvinyl alcohol (PVA), polyvinyl chloride (PVC), polyvinyl formal (PVF), polyisoprene, trans (PI), polypropylene (PP), low-density polyethylene (LDPE), high-density polyethylene (HDPE), PIP castline (PiPc), PIP natural (PiPn), polyvinylidene fluoride (PVDF), poly-lactic acid (PLA), and poly-L-lactic acid (PLLA). It should be understood that a blend of two or more such polymers can also be used. It should also be understood that a blend or block co-polymer of two or more such polymers can also be used. For example, in one embodiment, a blend of block co-polymer comprising PCL-block-PEO can be used to alter the functionality of the backing member and nanofibers.

As used herein "ribbon" or "ribbon-like structure" refers to an elongate strip of flexible polymeric material having an array of nanofibers formed on at least a portion of one of its planar surfaces. Nanofibers are formed on a functional backing material in web form. In a primary embodiment the webs are post processed by chopping or slitting to form the ribbon or ribbon like structures. However, for the purposes of the patent, the entire web may be considered a ribbon or ribbon like structure.

Figure 8:
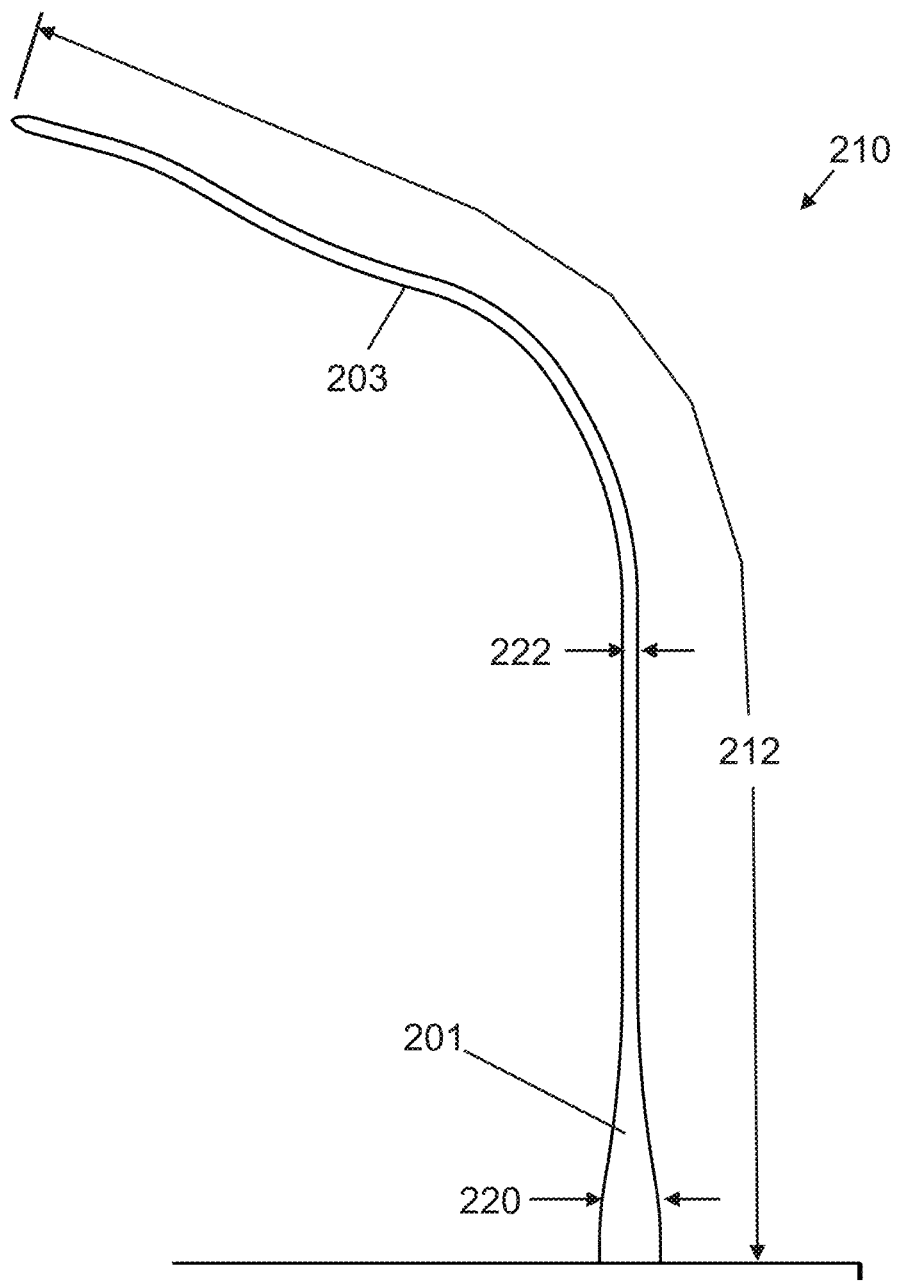
FIG. 8 is a side elevational view of an alternate embodiment nanofiber of filter media of the present invention.

FIGS. 2A through 7 diagrammatically depict a segment of a filter media ribbon 100 of the present invention. Ribbon 100 has an elongate planar film portion 102 of width 104 and thickness 106, with a first surface 108 on which are formed nanofibers 110. In some embodiments, width 104 is between 2× and 10× thickness 106. In others width 104 is between 10× and 40× thickness 106. And in yet others width 104 is between 40× and 100× thickness 106. Nanofibers 110 have a length 112 and are spaced distance 114 apart in the longitudinal direction and 116 in the transverse direction. Nanofibers 110 have a first diameter 120 near the base of the fiber and decrease in diameter toward the distal end of the fiber. As defined herein the term "nanofiber" refers to a fiber structure having a diameter of less than 1000 nanometers for more than half the length of the structure. In some embodiments, the nanofibers of filter media of the present invention may have a tapered base portion and a relatively longer fiber portion which extends from the base portion. Referring now to FIG. 8, nanofiber 210 has a tapered proximal base portion 201 of diameter 220 with elongate distal portion 203 of diameter 222 formed thereon, and a length 212.

Ribbon 100 is depicted with longitudinal distance 114 and transverse distance 116 between adjacent nanofibers 110 constant over surface 108. In other embodiments, either distance 114 or distance 116 or both may vary along the length of ribbon 100. Nanofibers 110 are shown in ordered parallel rows. In other embodiments other arrangements are used depending on the particular filtering process requirements. Similarly, height 112 and diameter 120 of nanofibers 110 are constant across the surface of ribbon 100. In other embodiments height 112 and diameter 120 of nanofibers on a first portion of surface 108 of ribbon 100 may have first values, while on a second portion of surface 108, height 112 and diameter 120 may have second values.

The process used to produce nanoholes 806 in chill roll 802 uses the energy of a single laser pulse to vaporize material so as to form the nanohole. The vaporized material of chill roll 802 is expelled to form a nanohole 806. The process is well controlled within limits, however the precise geometry of a nanohole 806 is determined by the flow of superheated vaporized material at the site. Accordingly, there may be minor variations in the form of nanoholes 806, and in the nanofibers 110 that are molded therein. Also, nanofibers 110, particularly those with long, tendrilous forms, may stretch somewhat during extraction from nanoholes 806. Therefore it will be understood that when it is stated that nanofibers 110 in an array have a height 112, height 112 is a nominal height, and individual fibers 110 may have a height that is somewhat greater or less than nominal height 112. Similarly, when considering diameters 120 of nanofibers 110, diameter 120 is a nominal value and there may be natural variations in the diameters 120 in nanofibers 110 within an array.

Nanofibers of the present invention may be broadly characterized by the ratio of their length (112 in FIGS. 7 and 212 in FIG. 8) to their average diameter. Typically nanofibers of filter media of the present invention have length to diameter ratios between 10:1 and 1,000:1. Nanofibers with length to diameter ratios at the lower end of the range may be used in applications in which the fibers require a degree of stiffness to optimally affect a fluid stream flowing thereby.

The nanofiber arrays formed on filter ribbons of the present invention may form a tuned topography. That is ribbons may be optimally configured to remove specific contaminants such as pathogens, chemical contaminates, biological agents, and toxic or reactive compounds from a fluid to be filtered. By selecting specific values for longitudinal distance 114 and transverse distance 116 between adjacent nanofibers (FIGS. 2 through 5), and diameters 120 and 220, and lengths 112 and 212 of nanofibers 110 and 200 (FIGS. 7 and 8) ribbons may be formed that preferentially remove a specific contaminant. Indeed, filtering devices may be formed in which ribbons of a first configuration optimally designed for removal of a first contaminant are combined with ribbons designed to remove a second contaminant. Additional ribbons with tuned topographies for removing specific contaminants may be added to remove these substances from the flow stream. The ribbons may be mixed in a filter device, or formed in discrete layers each containing a single ribbon configuration or a combination of two or more configurations.

Filter media ribbons with nanofibers of the present invention may be formed from virtually any polymeric material. These polymeric materials have inherent electrostatic properties and exert an electrostatic force at a point on the surface of an object formed therefrom that is inversely related to the radius of curvature of the surface at that point. As the radius of the surface at a given point is reduced, the electrostatic attractive force at that point increases. Accordingly, the electrostatic force exerted by a nanofiber is much greater than that exerted by a microfiber. This is of particular importance in filter applications in which contaminants smaller than the pore size of the filter must be removed from a fluid stream. Electrostatic forces draw contaminants to fibers for removal from the fluid stream. As the diameter of the fibers is decreased, the electrostatic force exerted by the fibers increases. The attractive force of a nanofiber is generally orders of magnitude greater than that of a microfiber, and therein lies the incentive for creating nanofiber filters. The high level of electrostatic force exerted by nanofibers allows them to efficiently remove contaminants from a fluid stream.

Figures 9, 10:
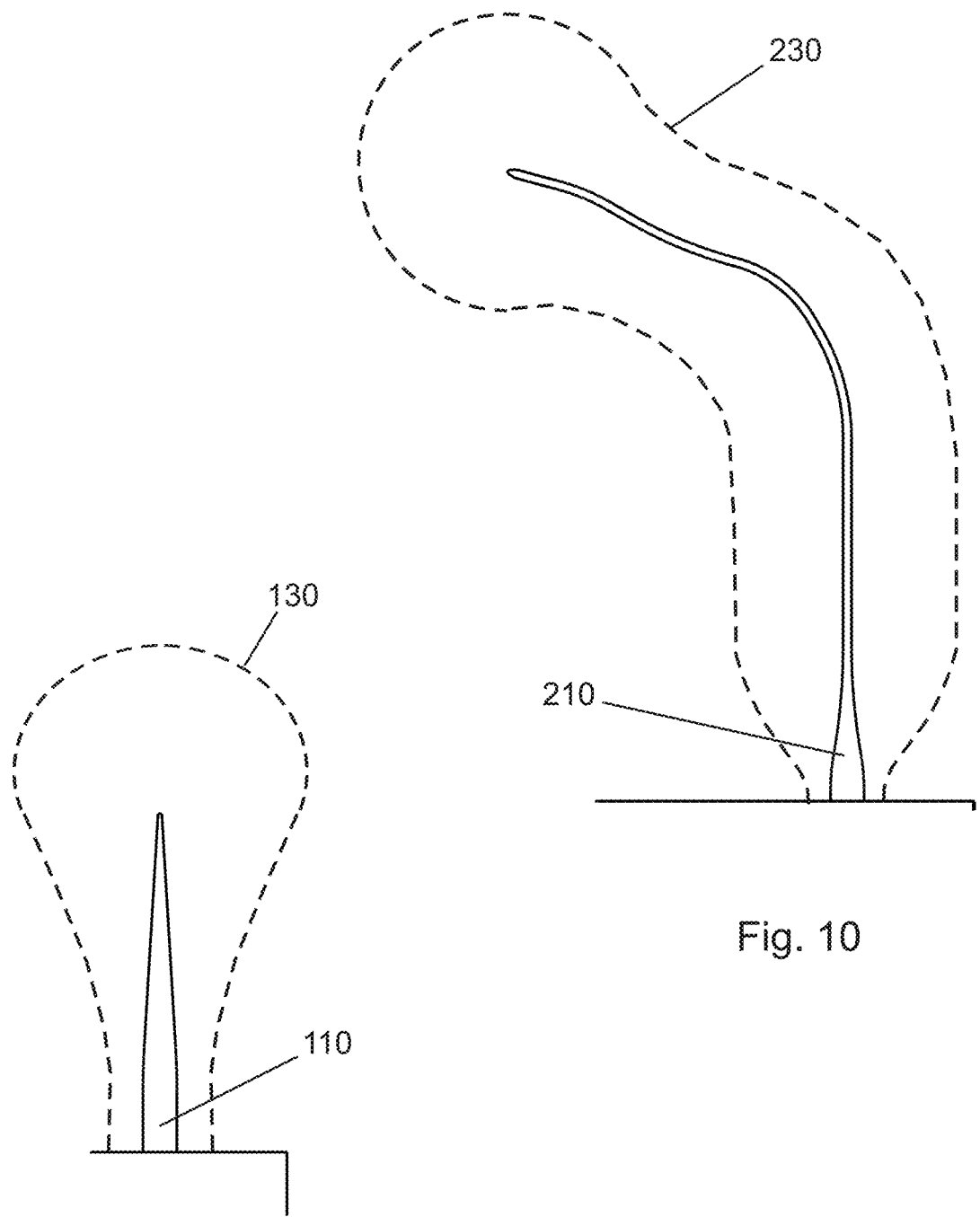
FIG. 9 is a side elevational view of the nanofiber of FIG. 7 depicting the electrostatic field surrounding the nanofiber.
FIG. 10 is a side elevational view of the nanofiber of FIG. 8 depicting the electrostatic field surrounding the nanofiber.

FIGS. 9 and 10 depict field lines 130 and 230 depicting the intensity of an electrostatic force field line surrounding nanofibers 110 and 210 respectively. As described previously, the field intensity at a point on the surface of a fiber is inversely proportional to the radius of curvature of the fiber at that point. This is reflected in the field line depicted. It should be noted that the field intensity is maximal at the distal end of the fibers. In prior art nanofiber filter medial formed by electrospinning or other conventional methods the nanofibers are virtually continuous with length to diameter ratios ranging from 1,000,000:1 to 100,000,000. Accordingly, for a given cumulative nanofiber length, fibers of the present invention will have from about ten to about one thousand times as many fiber ends. The associated higher electrostatic potential of nanofiber media formed in accordance with the present invention allows the construction of filters with efficiencies not attainable using nanofibers formed by electrospinning or other conventional methods.

The arrangement of nanofibers in an array can impact filtration specificity and efficiency by modulating the strong gradients in the electrical and chemical potential fields of normally highly reactive sub-micron length scale structures. Control of these gradients at process length scales can enhance efficiency of transport or flow. However, if two nanofibers are in close proximity and the potential fields overlap, then the gradient of the potential field is reduced and the advantages of the nanoscale topography are reduced. The arrangement of nanofibers in a nanofiber array of the proper scale and spacing will preserve the separation of nanofibers thus optimizing the potential field gradient.

An electrostatic charge may be imparted to the filter media of the present invention to increase the attractive force of the nanofiber arrays formed on ribbons. Filter ribbons of the present invention may be formed from a polymer or polymer blend with suitable electret properties. Among these materials are polypropylene, poly(phenylene ether) and polystyrene. In certain embodiments these ribbons may have a lamellar construction that has a first layer formed of an electret material on which are formed nanofiber arrays of the present invention, and a second layer bonded thereto with desirable physical and/or electrical properties. The materials selected for each layer may be optimized for a specific filtering application. Charging of the media may be accomplished by corona discharge, triboelectrification, polarization, induction, or another suitable method. Over time the imparted electrostatic charge may be dissipated by particle loading, and/or by quiescent or thermal stimulation decay.

Figure 11:
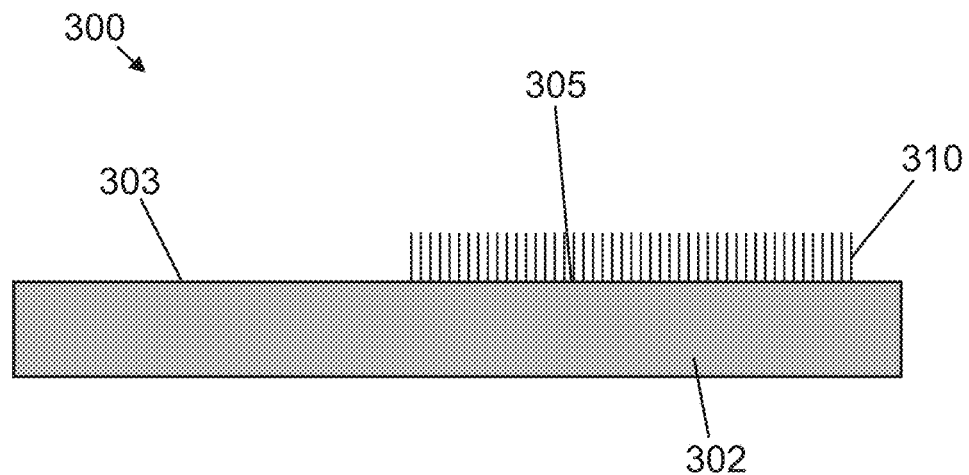
FIG. 11 is a side elevational sectional view of a planar polymeric element wherein a first portion of a planar surface comprises a nanofiber array of the present invention and a second portion does not.
Figure 12A:
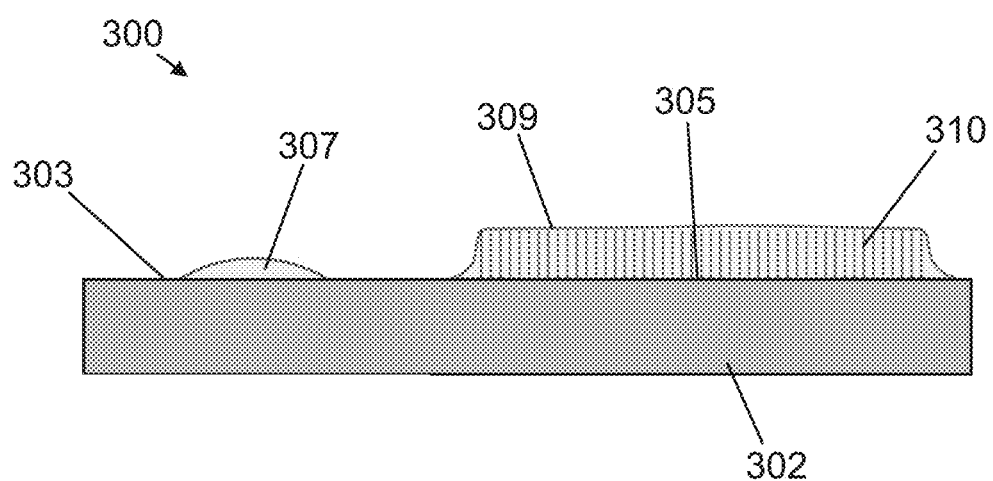
FIG. 12A depicts the polymeric element of FIG. 11 with liquid applied to each portion wherein the nanofibers increase the wettability of the surface.
Figure 12B:
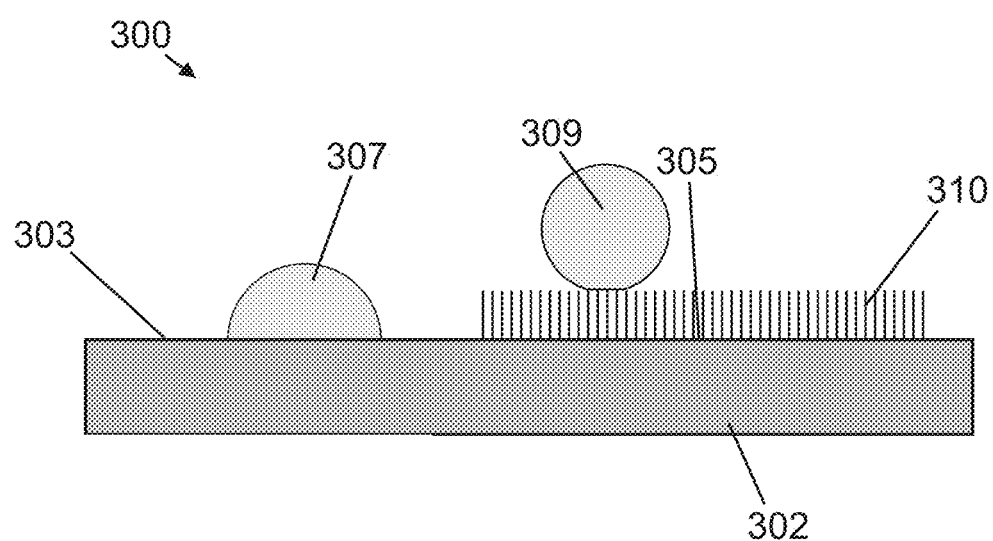
FIG. 12B depicts the polymeric element of FIG. 11 with liquid applied to each portion wherein the nanofibers decrease the wettability of the surface.

Nanofiber arrays on media ribbons of the present invention also advantageously affect the wetting of the surface of the ribbon by water vapor. Many polymers are hydrophobic, or have low wetting ability. The presence of nanofiber arrays of the present invention on the surface of a polymeric filter element increases the wettability of the surface so that vapor precipitates and collects on the filter media. Nano-textured nucleation of the liquid from the vapor is triggered by the tips of the nanofibers. Droplets grow to cover the surface of the media once a critical radius is reached. This wetting of the nanofiber array covered surface enhances the collection efficiency of the element. This is diagrammatically illustrated in FIGS. 11 and 12. FIG. 11 is a sectional view of a polypropylene element 300 with a substrate 302 on which a first portion 305 of the upper surface has formed thereon an array of nanofibers 310 of the present invention, and a second surface portion 303 does not have nanofibers. In FIG. 12A oil droplet 307 partially wets portion 303, while on the portion 305 with nanofibers 310 wetting of the surface by oil 309 is complete. By contrast, in FIG. 12B, the wetting of first portion 303 by oil droplet 307 is low, and the wetting of second portion 305 by oil 309 is lessened by nanofibers 310 as shown by spherical droplet 309 formed on nanofibers 310.

Methods for modifying the wettability of surfaces by forming nanofiber arrays thereon are discussed in detail in co-pending application U.S. 2020/0039122 herein incorporated by reference in its entirety.

Referring now again to FIGS. 2 through 6, because the nanofibers on media ribbons of the present invention are not structural members, but rather formed on a surface of a ribbon that serves as a structural member, width 104 and thickness 106 of planar film portion 102 of ribbon 100 may be selected for ease of processing and filter flow considerations. The thickness 106 and width 104 of planar film portion 102 must be sufficient to allow subsequent processing, and must allow for the efficient formation of nanofibers 110 on film 102. Within these constraints it may be desirable to minimize 104 so as to reduce the resistance to fluid flow through the filter element formed. Ribbon 100 is formed as a continuous elongate element that may be cut to length as required during processing.

Figure 13:
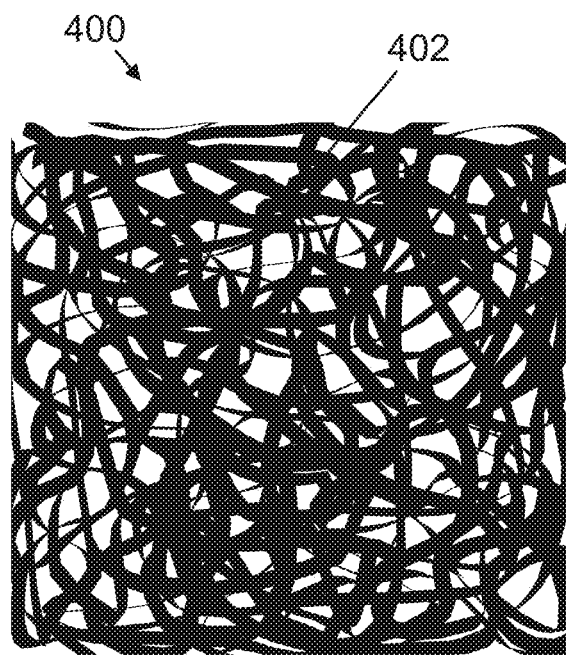
FIG. 13 depicts a nonwoven mat of nanofiber bearing ribbon elements of the present invention.

Woven filter media may be created from ribbons 100. The ribbons may be weaved individually in the structure, or may be formed into a multi-strand yarn prior to weaving. Alternatively, ribbons 100 can be formed into a non-woven mat 400 as depicted in FIG. 13. The orientation of ribbons 402 in mat 400 may be random, or may have a preferential orientation in which the nanofiber bearing surfaces of ribbons 402 lie at low angles to the direction of flow, the orientation being established during manufacture of mat 400.

Figure 14A:
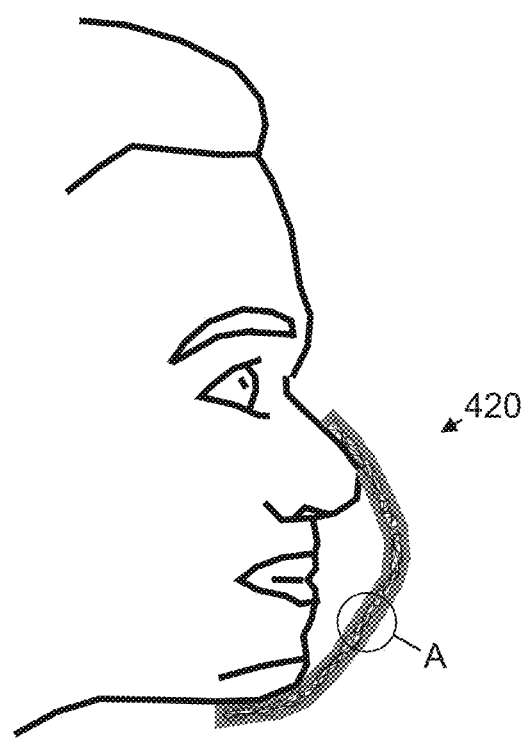
FIG. 14A depicts a personal filter mask formed with nanofiber filter media of the present invention.
Figure 14B:
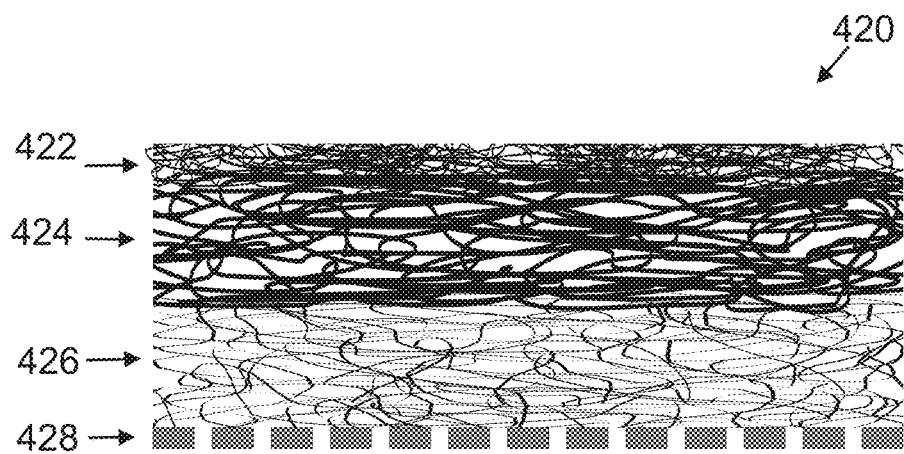
FIG. 14B depicts the layered structure of the mask of FIG. 14A at location A.

Referring now to FIG. 14A, respirator mask 420 achieves high filtering efficiency and low pressure drop through use of filter ribbons of the present invention. As depicted in FIG. 14B, mask 420 has a first outer layer 422 formed of ribbons of a hydrophobic polymer such as, for example, polypropylene. The ribbons forming first layer 422 have formed on them arrays of nanofibers configured to maximize the hydrophobic nature of the material. First layer 422 is preferably a woven or non-woven fabric. Second layer 424 is formed of microfibers configured to filter micron-sized coarse particles and some submicron-particles in the fluid stream. Microfibers of second layer 424 may be made of polyethylene, glass, cellulose acetate, activated carbon fiber or combinations thereof. Optionally second layer 424 may also contain nanofiber bearing filter ribbons of the present invention with the nanofiber arrays configured to optimally remove contaminants of a first composition or size. Third layer 426 is a non-woven mat formed of nanofiber bearing filter ribbons of the present invention. Because the ribbons from which this layer are formed have structural strength, the non-woven mat has a predetermined thickness and flow characteristics selected for optimal removal of contaminants while preserving airflow at low pressure drop and resistance to clogging. The arrays of nanofibers on these ribbons are optimally configured for the removal of small particles. Because of the higher attractive electrostatic forces of the nanofiber arrays compared to other filter elements with continuous random fibers, filter layer 426 is able to draw contaminants greater distances for removal from the fluid stream. In certain embodiments nanofiber arrays of ribbons forming third layer 426 may be configured to preferentially remove specific contaminants. Indeed, additional layers of ribbon mats of the present invention may be positioned proximal to this third layer, the nanofiber arrays of each layer being optimized to remove specific contaminants. Proximal to the previously described filter layers is permeable layer 428 formed of a fabric, woven or non-woven that may, in some embodiments, be comfortably pressed against the face of the wearer. In masks of the present invention, the filter layers are not bonded to each other. In production, the layers forming the filter assembly may be produced as continuous sheets of material, laid up in the proper order, and then bonded together in selected locations thermally, by a glue or solvent bonding, by stitching, or by needle punch, a joining method for non-woven fabrics. Because nanofibers of the present invention are integrally formed on the surface of ribbons of the present invention, the nanofibers cannot become loose and be inhaled by the wearer as is possible with respirators made with prior art filter assemblies.

Advantageously, for certain applications like mask 420, nanofiber bearing ribbons of the present invention may be formed of an antimicrobial plastic. Representative of these materials is MICROBAN® by Microban, Inc. (Huntersville, N.C.). MICROBAN® is a synthetic polymer material containing an integrated active ingredient which makes it effective against microbial growth. The MICROBAN® additive may be blended with polymers with optimal properties for forming nanofiber arrays in methods herein described to create filter ribbons of the present invention that not only have the ability to efficiently remove microbes from a fluid stream, but also to kill those microbes. In certain embodiments these ribbons have a lamellar construction wherein a first layer, on which are formed nanofiber arrays of the present invention, is bonded to a second layer with optimal physical properties, the first layer being formed of an antimicrobial plastic.

Prior art filter media formed of nanofibers are primarily made by electrospinning or a similar method that forms a thin, membrane-like fiber mat. Flow through the structure is substantially normal to the plane of the mat, and, because the fibers are not substantially distanced one from another in a direction normal to the plane of the mat, clogging may limit the filter life and efficiency. In contrast, filter media of the present invention comprises ribbons with cross-sections orders of magnitude greater than nanofibers. This allows the construction of filters wherein the media ribbons are spaced one from another so as to create a resilient three-dimensional structure. Because the fibers are so spaced, flow through the filter media is not restricted to a single direction. Indeed, a suitable housing may be filled with ribbons of the present invention and flow may proceed from a defined inlet to a defined outlet with the path therebetween being undefined. Indeed, baffles may be added to lengthen the path for flow through the media. In filter media of the present invention the nanofibers are not structural members but rather are features on a structural members, these features being configured to create attractive electrostatic forces that are orders of magnitude greater than those created by filter elements wherein the nanofibers are structural members. Particles suspended in a fluid exhibit random motion resulting from their collisions with fast-moving fluid molecules, an effect known as "Brownian Motion". Filter elements formed of ribbons of the present invention create flow paths that are orders of magnitude longer than those of prior art membrane-like nanofiber filter elements. These longer flow paths take advantage of the Brownian Motion effect to allow the building of filters that have a high filtering efficiency combined with a low pressure drop, and the added benefit of an increased resistance to clogging.

Figure 15:
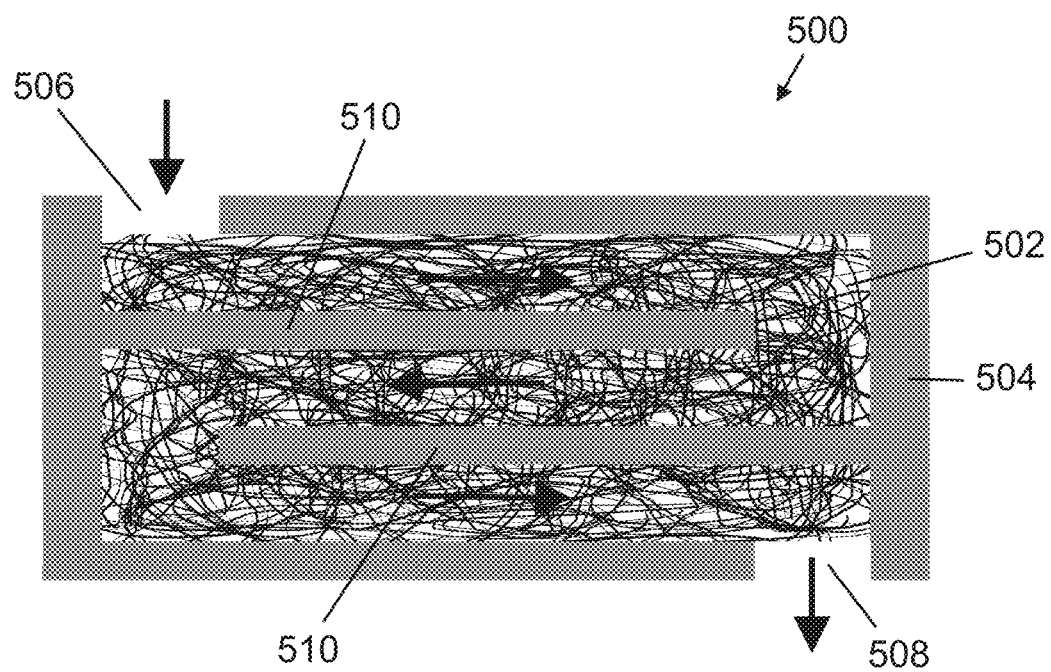
FIG. 15 is a sectional view of a composite filter media assembly including elongate filter ribbons of the present invention.

FIG. 15 depicts a filter 500 wherein media 502, formed of media ribbons of the present invention, is contained within a housing 504 with an inlet 506 and an outlet 508. Housing 504 has formed therein baffles 510 that form a labyrinthian flow path between inlet 506 and outlet 508. The long flow path through media 502 exploits the Brownian Motion effect to maximize interaction between contaminants and the electrostatic field created by nanofiber arrays on ribbons of media 502. Filter 500 illustrates the design flexibility that is enabled by filter ribbons of the present invention. While prior art nanofiber filter elements have only a simple flow path with the limitations previously herein described, filter media formed of ribbons of the present invention may be utilized in substantially the same manner as conventional microfiber media.

Figure 16A:
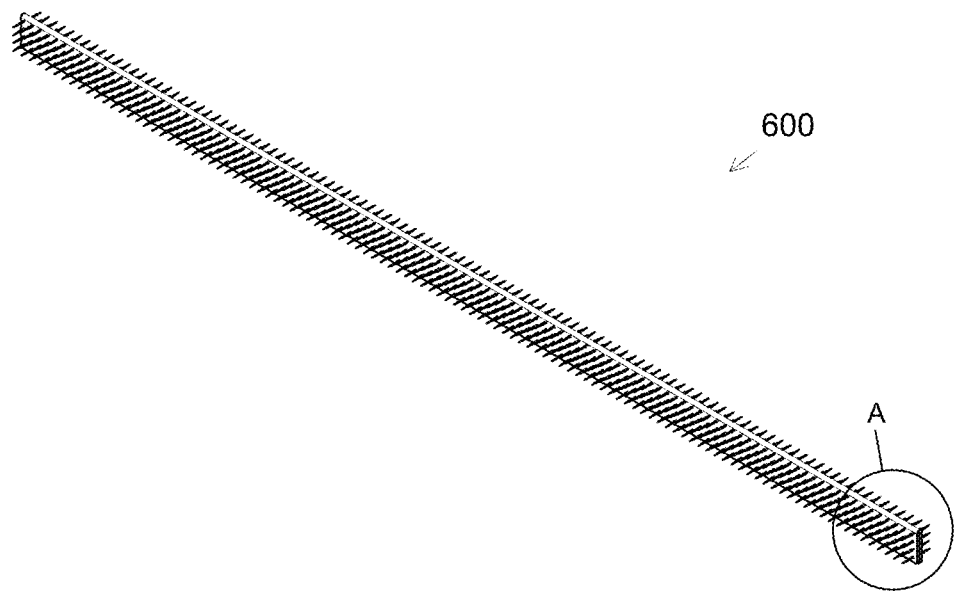
FIG. 16A is a perspective depiction of an alternate embodiment filter ribbon of the present invention.
Figure 16B:
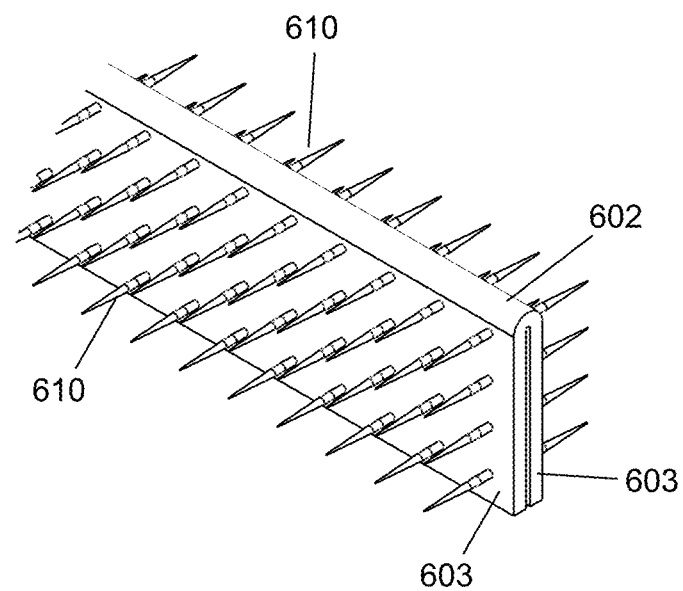
FIG. 16B is an expanded view of the objects of FIG. 16A at location A.

While filter element ribbons and ribbon segments of the present invention have been previously described and depicted with flat film portions, other shapes are contemplated and fall within the scope of this invention. For instance, ribbon 600 depicted in FIGS. 16A and 16B has a film portion 602 that is folded longitudinally during manufacture. As depicted, the fold remains closed with the film halves 603 being essentially parallel. In other embodiments film halves 603 are angularly oriented one to another due to spring-back of the material after folding. This angular orientation may be as great as 150 degrees in certain embodiments.

Figure 17A:
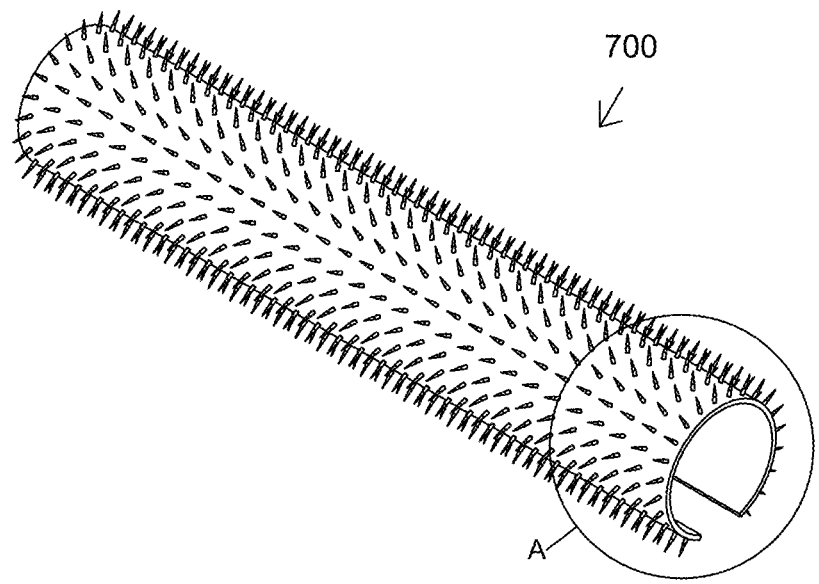
FIG. 17A is a perspective depiction of another alternate embodiment filter ribbon of the present invention.
Figure 17B:
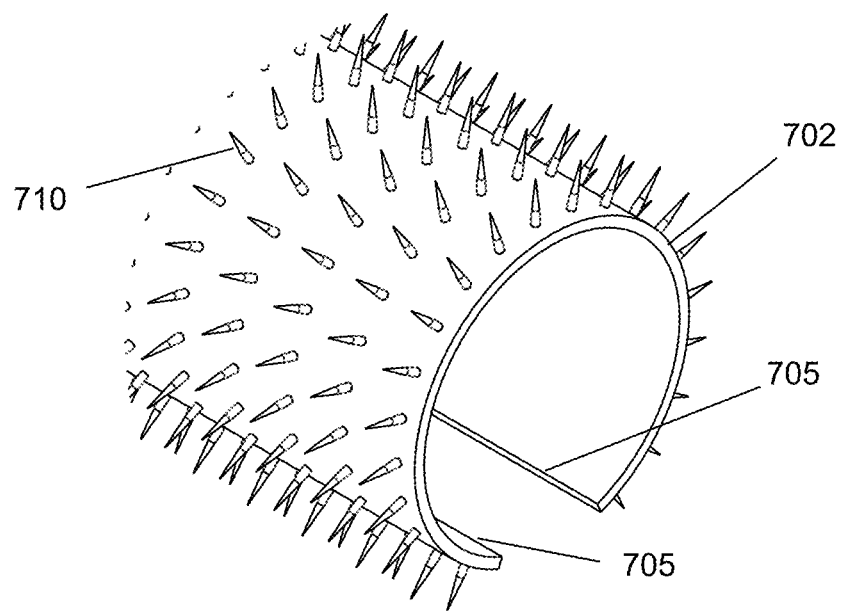
FIG. 17B is an expanded view of the objects of FIG. 17A at location A.

FIGS. 17A and 17B depict ribbon 700 in which the film portion 702 is given a form similar to a hollow fiber during manufacture. Nanofibers 710 protrude radially outward from film portion 702. In some embodiments edges 705 of film portion 702 may meet to form a complete cylindrical body. In others they may be separated by distances that approach the inner diameter of the formed ribbon.

Figure 18:
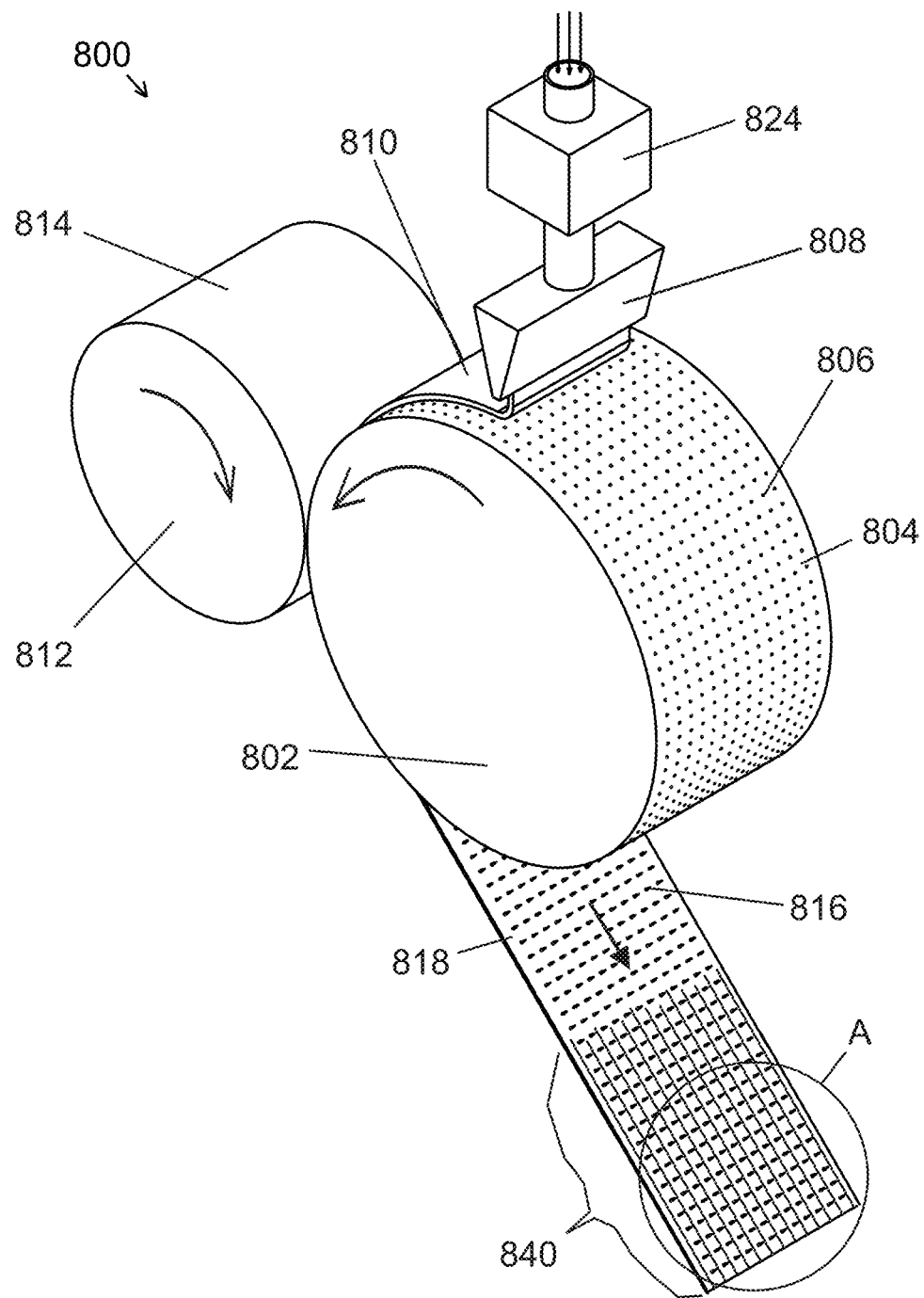
FIG. 18 is a perspective schematic representation of a chill roll casting system for making nanofiber filter elements of the present invention configured for directly producing filter ribbons of the present invention.
Figure 19:
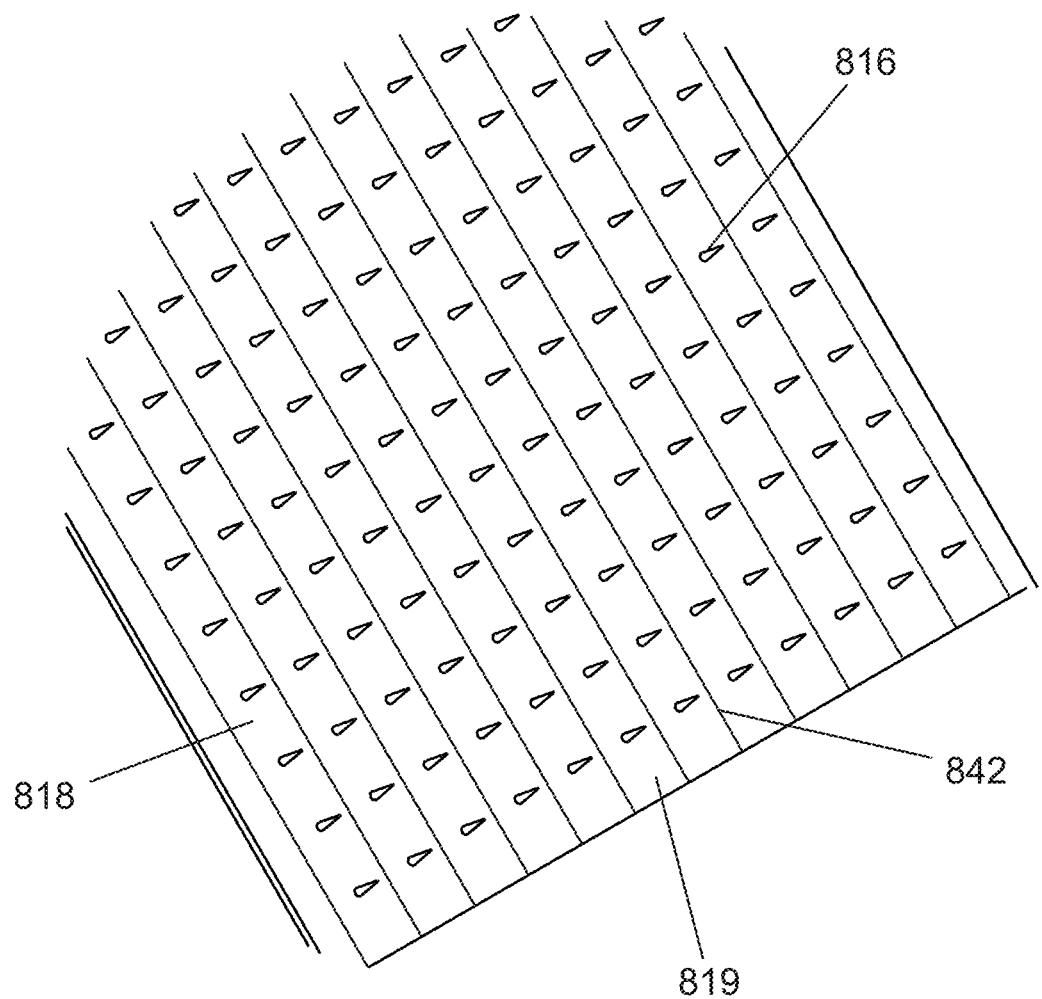
FIG. 19 is an expanded view of the objects of FIG. 18 at location A.

Unlike prior art processes for producing nanofibers filter media, the chill roll casting process previously herein described is scalable and may be automated to enable production of quantities of nanofiber-bearing filter ribbons rapidly and at low cost. For instance, referring now to FIGS. 18 and 19 depicting chill roll casting system 800 (FIGS. 1A through 1D), slitting of film strip 818 may accomplished automatically by adding a slitting means as depicted in FIG. 18. Subsequent to the removal of film strip 818 from chill roll 802, a plurality of slits 842 are formed in strip 818 so as to form a plurality of filter ribbons 819 of the present invention as depicted in region 840 of FIG. 18. Ribbons 818 are analogous in form and function to elongate ribbons 100 depicted in FIGS. 2 through 7. However, in other embodiments (not shown), the slitting means may be placed adjacent the chill roll 802 and configured to form a plurality of slits in the cooled polymer covering the chill roll 802 before removing the film strip 818 from chill roll 802. The slitting may be accomplished by mechanical means using a rotating cylindrical cutting element with a plurality of sharpened circumferential cutting edges formed on its cylindrical surface, and a second rotating cylinder. The axes of both cylinders are parallel to the axis of chill roll 804, and are positioned such that the cutting edges of the cutting element contact or are in very close proximity to the surface of the second rotating cylinder. Strip 818 passes between this rotating cutting element and the second cylinder so that each cutting edge forms a continuous longitudinal slit 842 in strip 818. Slitting of film material in this manner is well known in the art.

In the casting system of FIGS. 18 and 19 longitudinal slits 842 are formed in strip 818 automatically as strip 818 is produced. In other methods of the present invention, slitting of strip 818 is done as a secondary process remote from the system 800. Strip 818 can be wound onto a spool for storage and subsequent slitting. In the previous example, longitudinal slits 842 were formed in strip 818. In other methods for making filter ribbons of the present invention, lateral slits are made to form ribbons. Indeed, any method of cutting, slitting or chopping a film strip on which nanofiber arrays are formed may be used to form filter ribbons of the present invention. All fall within the scope of this invention.

In some embodiments, filter media ribbons of the present invention are divided into segments of predetermined length. These segments may be formed into non-woven mats or placed in a housing as previously described.

Figure 20:
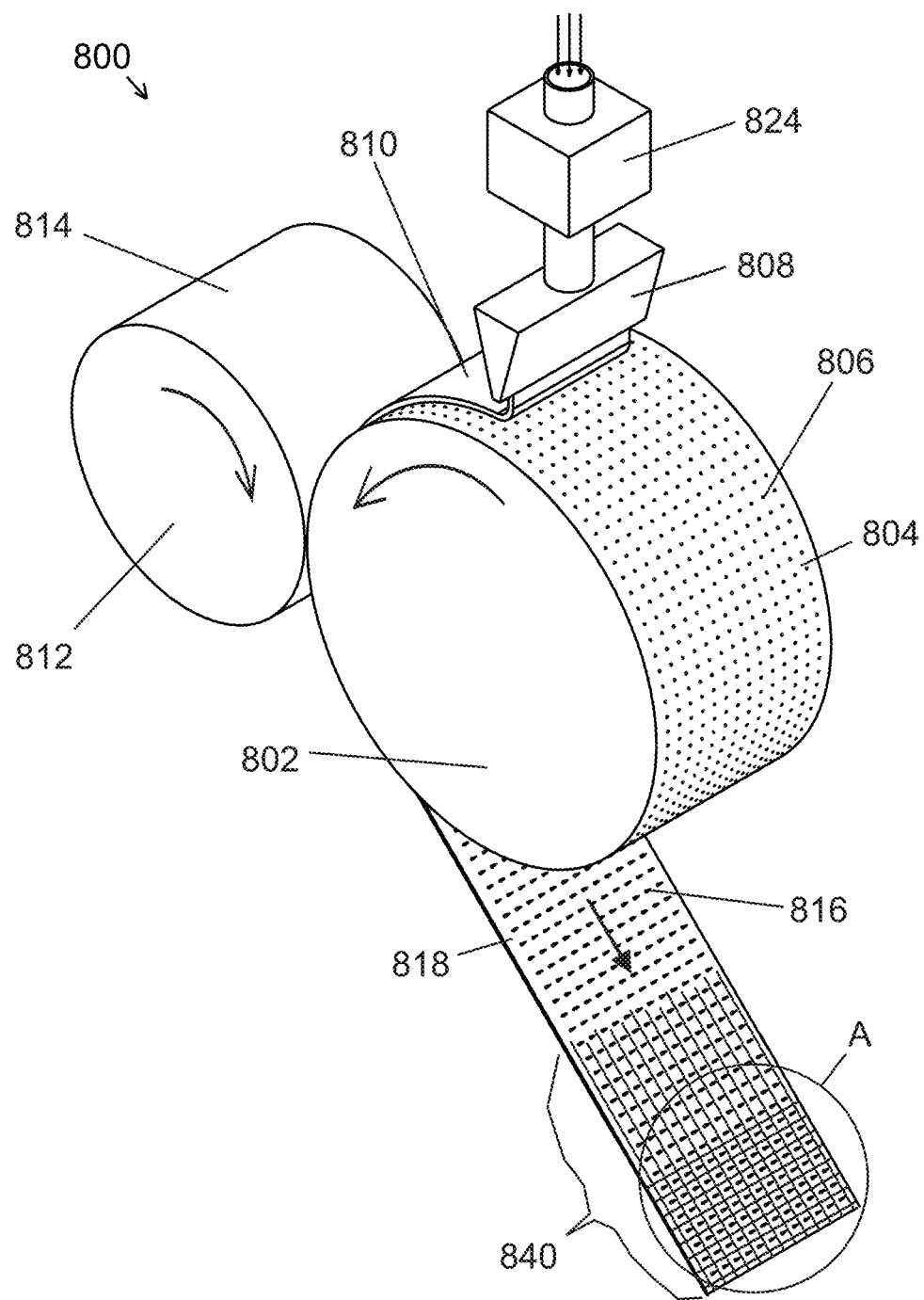
FIG. 20 is a perspective schematic representation of a chill roll casting system for making nanofiber filter elements of the present invention configured for directly producing filter ribbon segments of the present invention.
Figure 21:
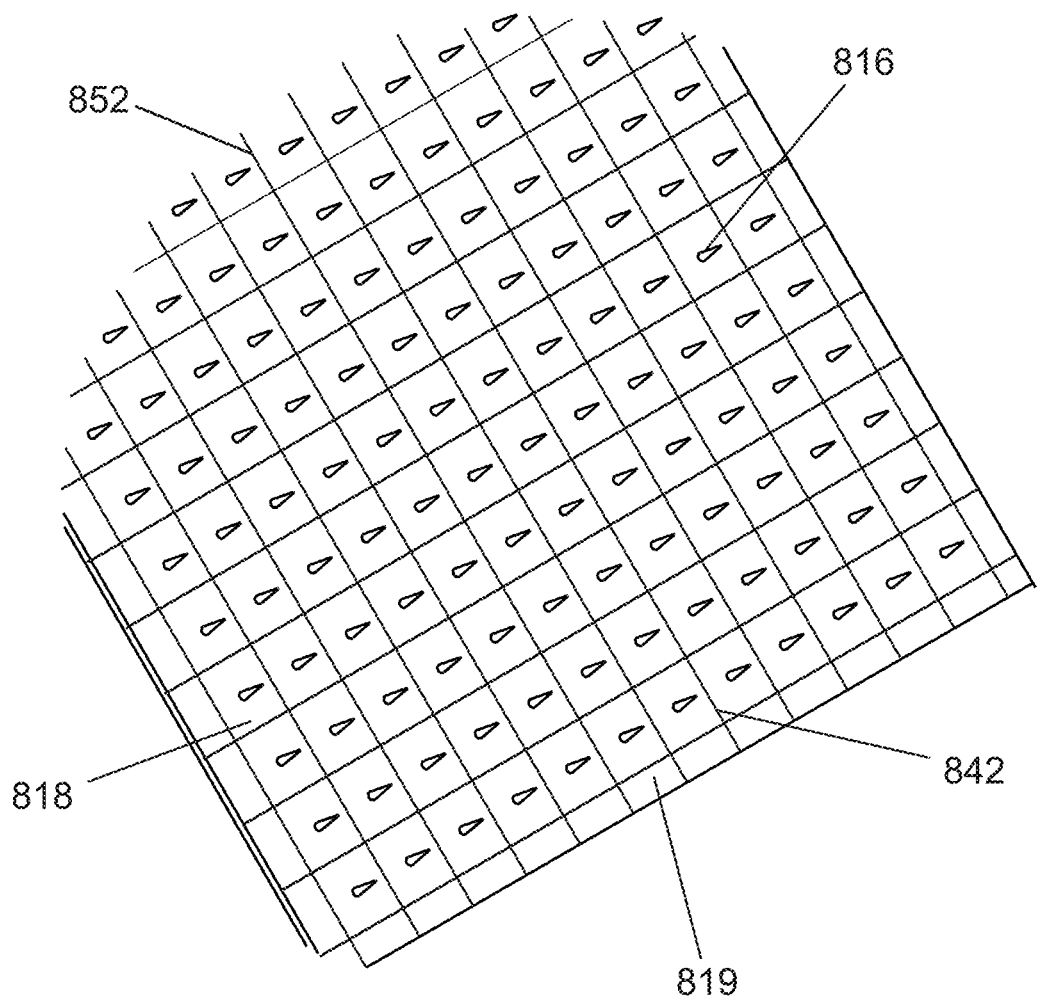
FIG. 21 is an expanded view of the objects of FIG. 20 at location A.
Figure 22:
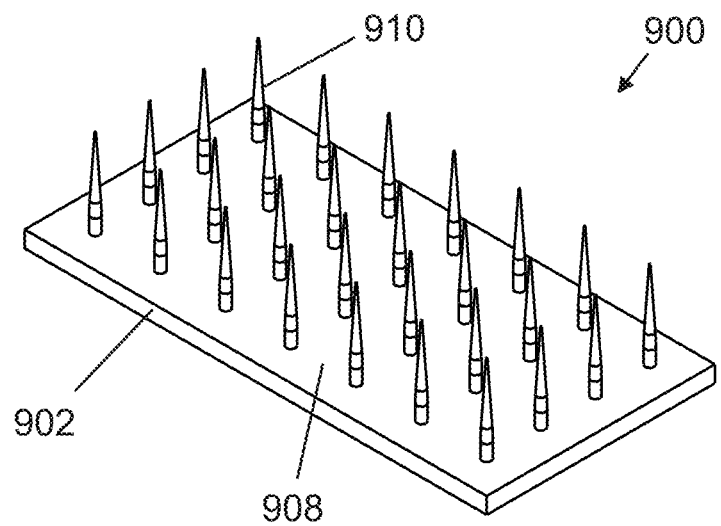
FIG. 22 is a perspective view of a filter ribbon segment of the present invention.
Figure 23:
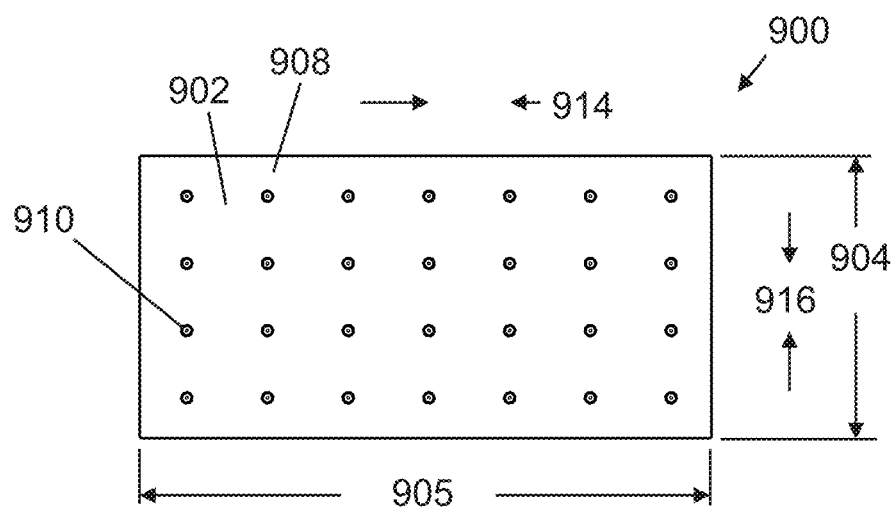
FIG. 23 is a plan view of the objects of FIG. 22.
Figure 24:
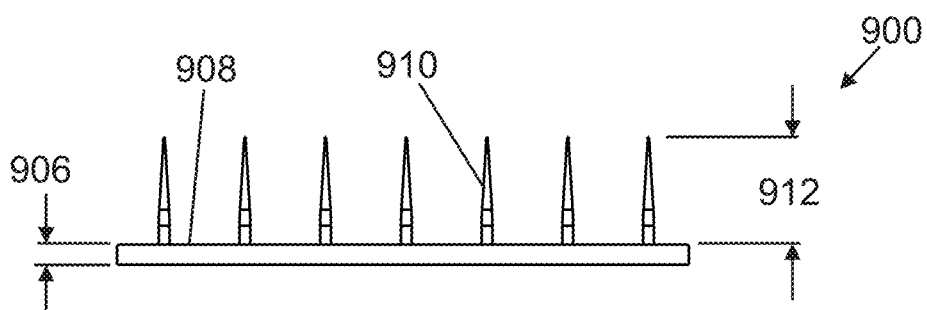
FIG. 24 is a side elevational view of the objects of FIG. 22.

FIGS. 20 and 21 depict the chill roll system of FIGS. 18 and 19 with a means added for automatically cutting ribbons 819 into short segments 900 depicted in FIGS. 22 through 24. Lateral cuts 852 are formed in ribbons 819 by a rotating cylindrical cutting element with axially oriented cutting edges formed on the circumferential surface of the elements. As with the forming slits 842 in strip 818, lateral cuts are formed by cooperative action between the cylindrical cutting element and a second cylinder as previously described. Transection of strip 818 by lateral cuts 852 creates a plurality of segments 900, length 905 of segment 900 being determined by the spacing of cutting edges on the cylindrical cutting element.

Segment 900 is identical to ribbon 100 in all aspects except as specifically hereafter described. Like ribbon 100, segment 900 has arrays of nanofibers 910 formed on first surface 908 of film portion 902. However, segment 900 has a predetermined length 905. In some embodiments length 905 is 100× or greater than width 904 of ribbon 900. In other embodiments, length 905 is between 10× and 100× width 904 of ribbon 900. In yet other embodiments, length 905 is between 1× and 10× width 904 of ribbon 900. The length of a segment for an application may be optimized based on filtering requirements and on the method of manufacturing the filter. For instance, if the filter will incorporate a non-woven mat formed of segments 900, it may be advantageous to make length 905 a higher multiple of width 904 than would be the case if segments 900 were to fill a cavity in a housing.

Figure 25:
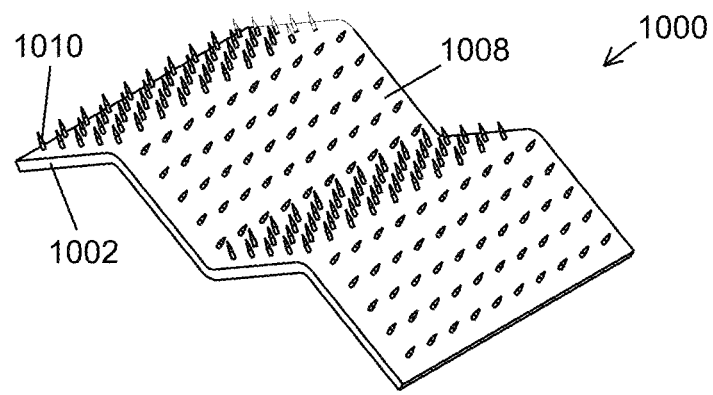
FIG. 25 is a perspective view of an alternate embodiment filter ribbon segment of the present invention.
Figure 26:
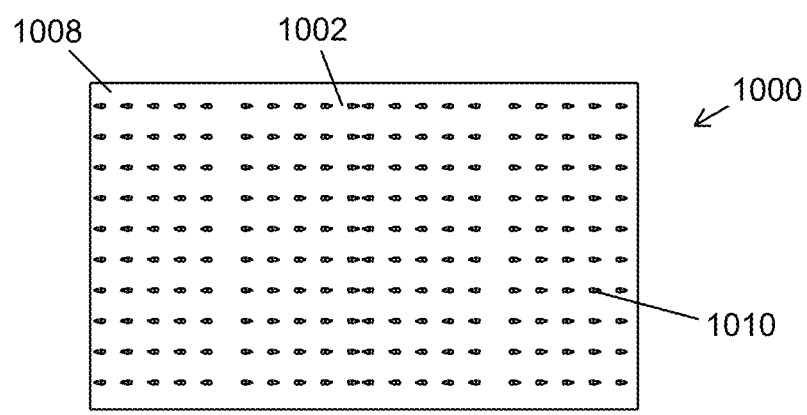
FIG. 26 is a plan view of the objects of FIG. 25.
Figure 27:
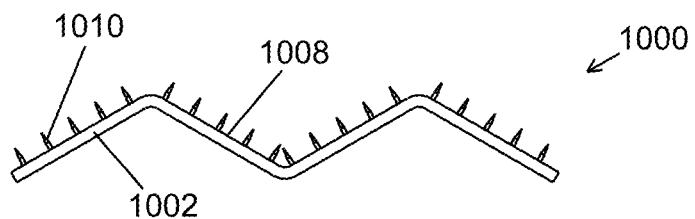
FIG. 27 is a side elevational view of the objects of FIG. 25.
Figure 28:
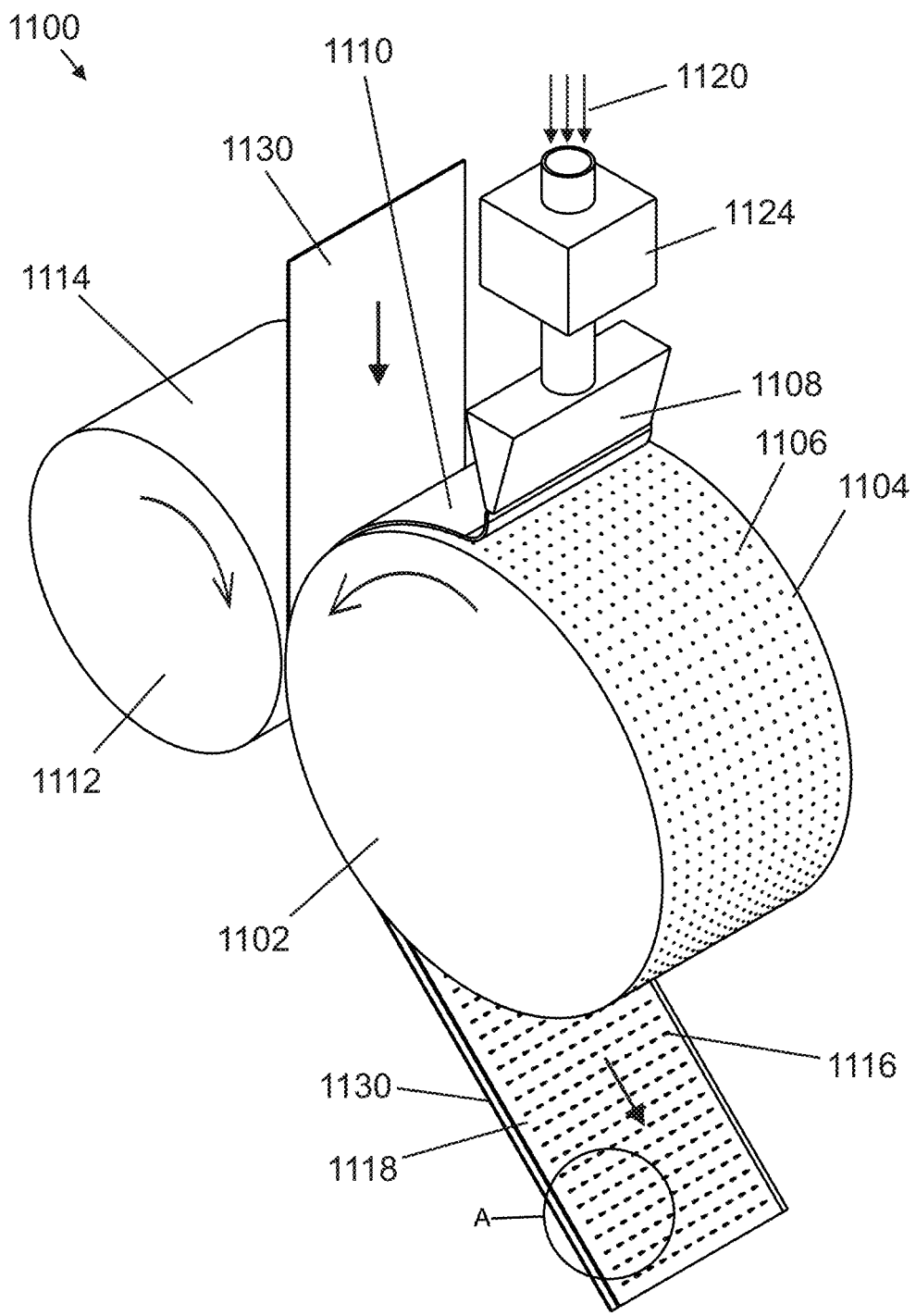
FIG. 28 is a perspective schematic representation of an alternate embodiment chill roll casting system for making nanofiber filter elements of the present invention, configured for producing nanofiber bearing film wherein a nanofiber bearing layer of a first material is bonded to a film of a second material.
Figure 29:
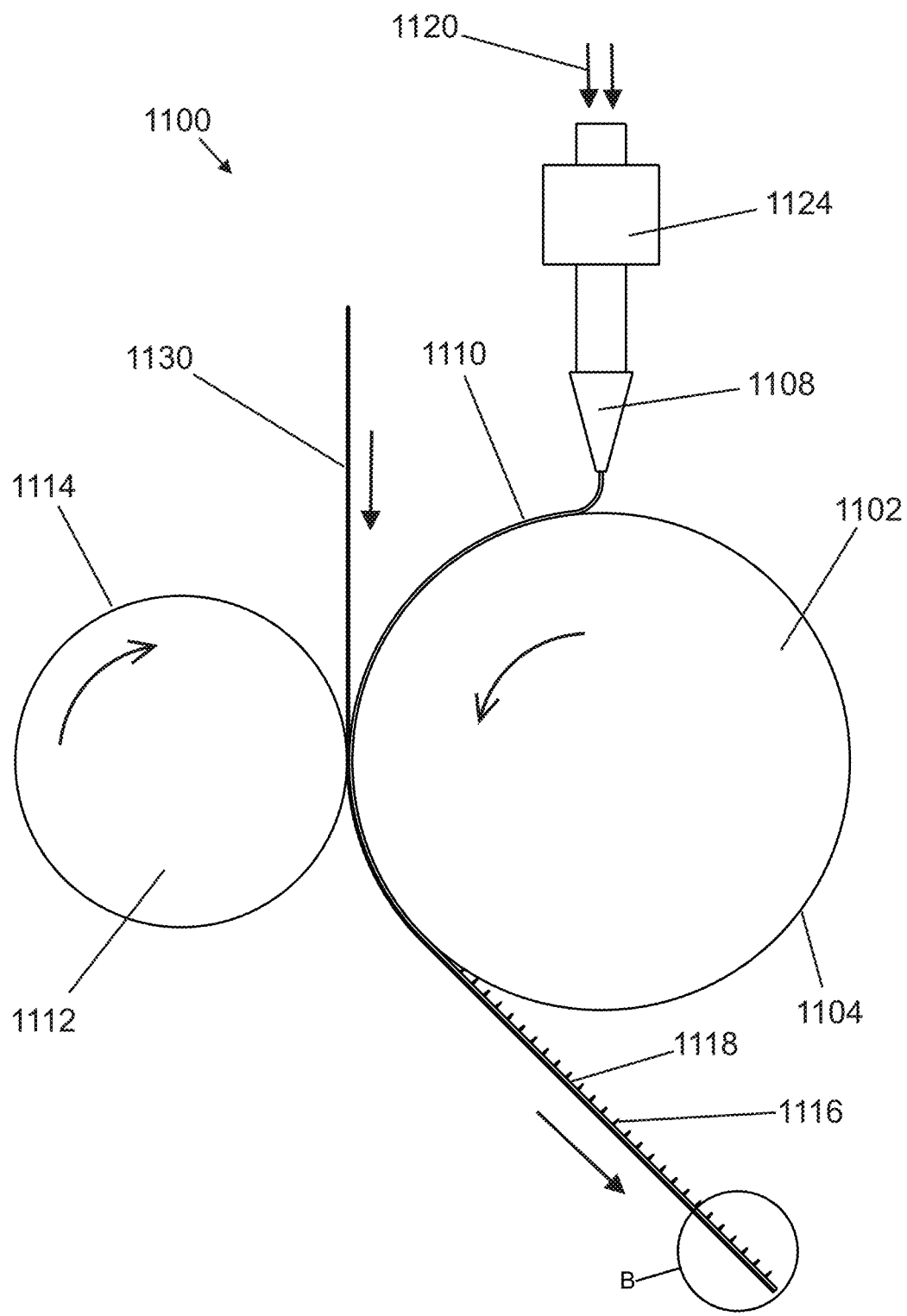
FIG. 29 is a side elevational view of the objects of FIG. 28.
Figure 30:
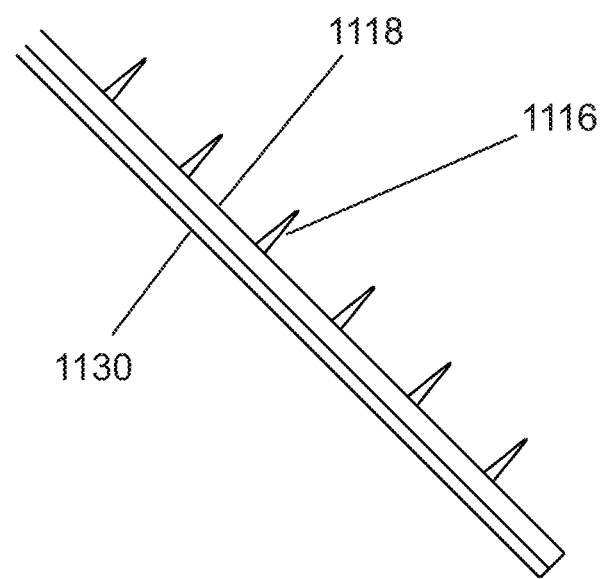
FIG. 30 is an expanded view of the objects of FIG. 29 at location B.
Figure 31:
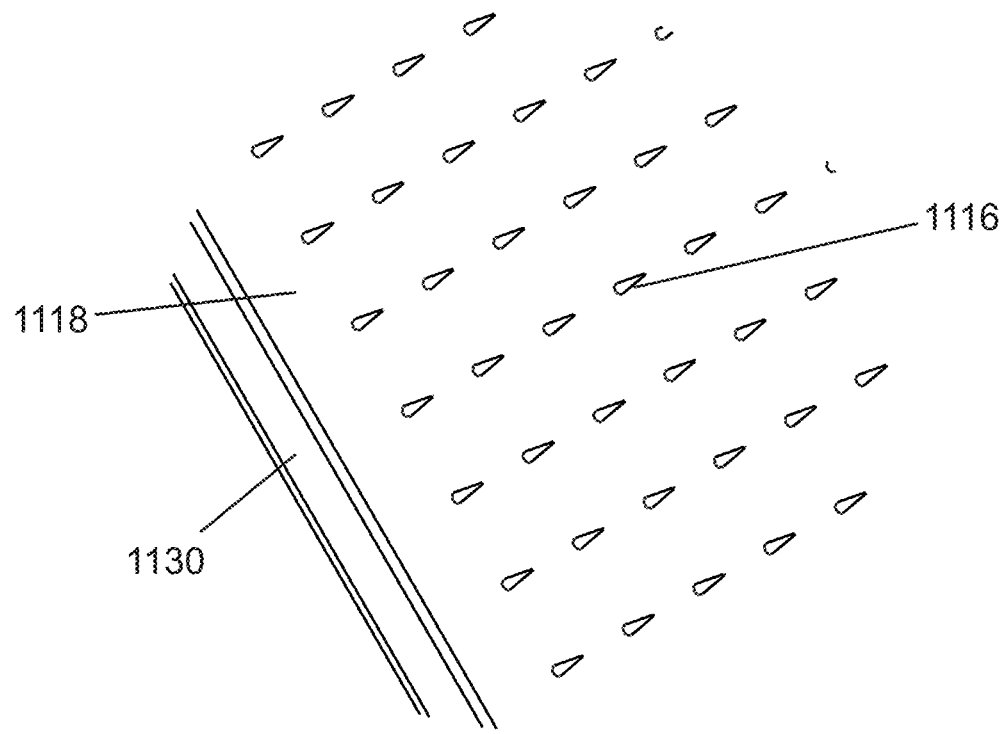
FIG. 31 is an expanded view of the objects of FIG. 28 at location A.

In certain embodiments ribbon segments may have a shape imparted to the film portion so that when the segments are assembled in a non-woven mat or into a filter housing, natural flow paths between segments are created. Referring now to FIGS. 25 through 27, segment 1000 is like segment 900 with an array of nanofibers 1010 formed on first surface 1108 of film portion 1002. Film portion 1002 is not flexibly planar as in previously described embodiments, but rather has a form imparted thereto during manufacture. Forming of film portion 1002 in the manner depicted for segment 1000 may also be advantageously applied to elongate filter ribbons of the present invention so as to aid in the creation of flow paths through the assembled filter element.

When viewed in a plan view, ribbon segments 900 and 1000 have a rectangular shape imparted by the orthogonal cuts that formed them. In other embodiments formed by other slitting, cutting or chopping methods, the shape of the ribbon segments may have other predetermined shapes, or may be randomly formed segments with irregular shapes. All fall within the scope of this invention.

FIGS. 28 through 31 depict a chill casting system of the present invention for making a layered film for forming filter ribbons of the present invention. Polymer 1120 is supplied via tubular member 1122 to extrusion head 1108. Polymer 1120 is heated above its melt point by heater 1124 and the melted polymer 1110 is then applied to rotating chill roll 1102. Molten polymer 1110 flows into nanoholes 1106 as it is applied to circumferential surface 1104 of rotating chill roll 1102. Polymer film 1130 is drawn into the juncture between quench roll 1112 and cylindrical surface 1108 of chill roll 1104 upon which melted polymer 1110 has been deposited. Quench roll 1112 cools molten polymer 1110 in the manner previously described, but also forms a bond between film 1130 and polymer 1110 so that when film strip 1118 is removed from chill roll 1104 as a layered construct with a first layer on which are formed nanofiber arrays of the present invention, and a second layer formed of film 1130. In this manner film and the filter ribbons from which they are formed may have nanofiber arrays formed of a first polymeric material 1110 with optimal filtering or wetting properties for a given application, bonded to a second polymeric material forming film 1130. Forming a construct in this manner allows polymers with optimal properties for nanofiber formation and/or filtering to be bonded to polymer films that have optimal properties for filter production.

Figure 32:
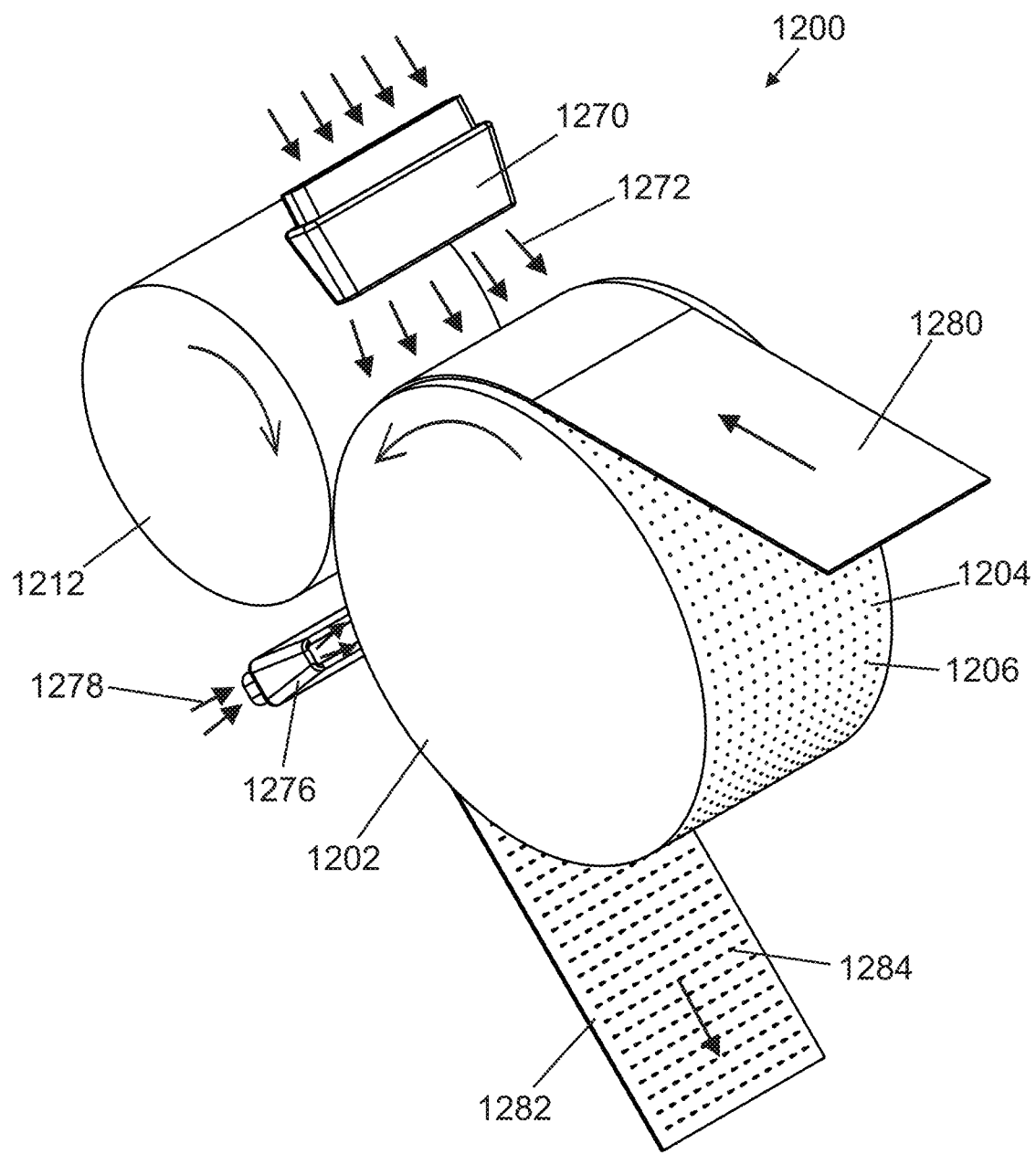
FIG. 32 is a perspective view of an alternative method system for producing nanofiber bearing filter ribbons of the present invention.
Figure 33:
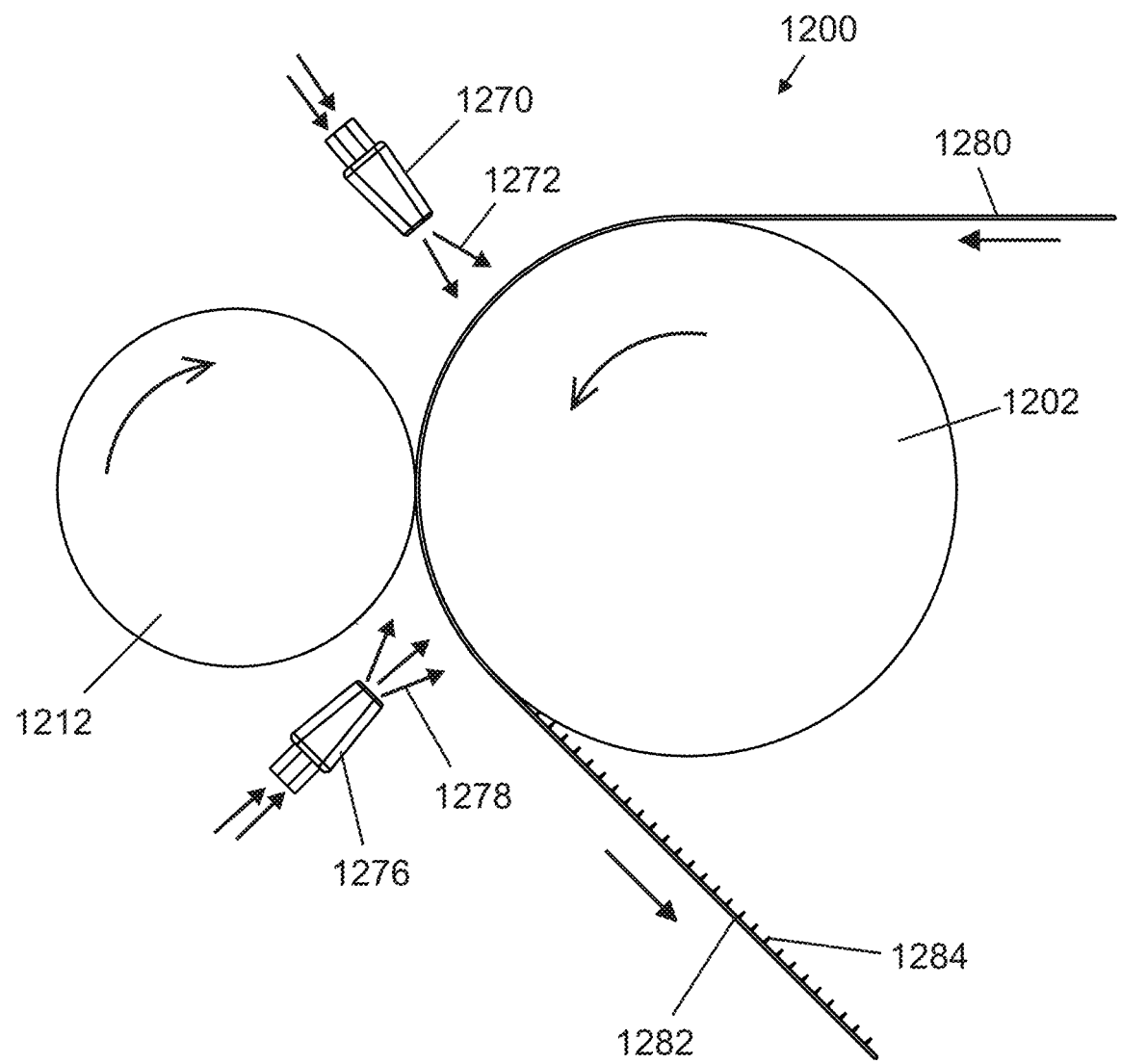
FIG. 33 is a side elevational view of the objects of FIG. 32.

In an alternate system for making films with nanofiber arrays for producing filter ribbons of the present invention, nanofibers are embossed on an existing film of polymeric material, the embossing being accomplished in a process similar to the chill casting method previously herein described. In previous embodiments a molten polymer is applied to the mold. In the embossing embodiment film is applied to the mold; the film is sufficiently heated to allow the material to flow into the mold nanoholes, then cooled so that the film with its newly formed nanofibers can be peeled from the mold. Referring now to FIGS. 32 and 33 depicting an embossing system 1200 of the present invention, film 1280 wraps around circumferential surface 1204 of mold 1202 wherein are formed nanoholes 1206. Film 1280 is heated by airflow 1272 from nozzle 1270 sufficiently to melt or sufficiently softened to allow film material to flow into nanoholes 1206. Quench roll 1212 applies a compressive force to softened film 1280 that assists with the flow of film material into nanoholes 1206. Chilled air 1278 from nozzle 1276 cools film 1280 so that chilled film 1282 with nanofibers 1284 can be peeled from cylindrical surface 1204 of chill roll 1202. Film 1282 is like film 818 with nanofibers 816 formed by casting system 800 (FIGS. 18 to 21) in all aspects of form and function. Layered films with embossed nanofibers may also be made by a method similar to that previously described and depicted in FIGS. 28 through 31. In the embossing method a second film is drawn into the juncture between quench roll 1212 and film 1280 so as to bond film 1280 to the second film. System 1200 uses heated airflow to increase the temperature of film so that film material can flow into nanoholes. In other embodiments film 1280 is heated by a radiant heater or other suitable means.

In other embodiments, film 1280 is formed of a malleable polymer that is applied to surface 1204 of mold/chill roll 1202 such that the malleable polymer film 1280 infiltrates at least a portion of nanoholes 1206. Roll 1212 is maintained at a temperature such that compressive force applied by roll 1212 to film 1280 causes further infiltration of film 1280 into nanoholes 1206 and solidification of that material and of material covering surface 1204 of chill roll 1202. Thereafter, film 1282 with nanofibers 1284 formed thereon is removed from roll 1202 in the manner previously described.

Filter media of the present invention provide the benefits of nanofibers in elongate ribbons that can be subsequently processed in largely the same manner as conventional fibrous filter media. Filter media of the present invention are not deposited on a substrate during manufacturing and are configured to maximally exploit the electrostatic properties of the materials from which they are formed. Along with enhanced electrostatic properties, the nanofibers arrays of ribbons may affect the wettability of the ribbon surface on which they are formed. Wettability for selected liquids may be preferentially enhanced while decreasing the wettability for other liquids thereby increasing filter efficiency. Because the nanofiber arrays are integral with the ribbon they cannot be expelled from the filter media. Ribbons or the present invention with nanofibers integrally formed thereon may be produced at reduced cost compared to conventionally produced nanofiber media, and without the use of high voltage or environmentally detrimental solvents.

According to the principles of the present invention, any flexible elongate ribbon-like polymeric structure having arrays of nanofibers formed on at least one surface falls within the scope of this invention regardless of the method of manufacture of the structure.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A filtration medium, comprising:
    a first filter layer comprising a plurality of polymeric ribbons or ribbon segments, each ribbon or ribbon segment having a surface on which is formed a first array of nanofibers, wherein each ribbon or ribbon segment contacts another ribbon or ribbon segment of the plurality; and
    a hydrophobic filter layer comprising a plurality of hydrophobic polymeric ribbons or ribbon segments, each hydrophobic ribbon or ribbon segment having a surface on which is formed a second array of nanofibers.

2. The filtration medium of claim 1, further comprising:
    a coarse filter layer comprising a plurality of microfibers;
    wherein the first filter layer is secured to at least one of the hydrophobic filter layer or the coarse filter layer.

3. The filtration medium of claim 2, wherein:
    the first array of nanofibers is configured to remove a first contaminant from a fluid stream flowing through the filtration medium;
    the second array of nanofibers is configured to increase the hydrophobicity of material from which the hydrophobic polymeric ribbons are formed; and
    the plurality of microfibers is configured to remove from the fluid stream a second contaminant that is larger than the first contaminant.

4. The filtration medium of claim 3, further comprising a second filter layer secured to the first filter layer or the coarse filter layer, the second filter layer comprising a second plurality of polymeric ribbons or ribbon segments, each ribbon or ribbon segment of the second plurality having a surface on which is formed an array of nanofibers configured to remove a predetermined contaminant from the fluid stream.

5. The filtration medium of claim 1, wherein each ribbon or ribbon segment has a thickness that is at least ten times greater than a diameter of the nanofibers.

6. The filtration medium of claim 1, wherein the plurality of polymeric ribbons or ribbon segments is woven or non-woven.

7. The filtration medium of claim 1, wherein the plurality of polymeric ribbons or ribbon segments are substantially planar.

8. The filtration medium of claim 1, wherein each ribbon and ribbon segment is substantially rectangular.

9. A filtration medium, comprising:
    a first permeable sheet;
    a second permeable sheet; and
    a first plurality of polymeric ribbons or ribbon segments secured between the first and second permeable sheets, each ribbon or ribbon segment having a surface on which is formed a first array of nanofibers.

10. The filtration medium of claim 9, further comprising:
    a second plurality of polymeric ribbons or ribbon segments secured between the first and second sheets, each ribbon or ribbon segment of the second plurality having a surface on which is formed a second array of nanofibers.

11. The filtration medium of claim 10, wherein:
    the first array of nanofibers is configured to remove a first contaminant from a fluid stream flowing through the filtration medium; and
    the second array of nanofibers is configured to remove from the fluid stream a second contaminant that is different from the first contaminant.

12. The filtration medium of claim 9, wherein each ribbon or ribbon segment of the first plurality contacts another ribbon or ribbon segment of the first plurality.

13. The filtration medium of claim 9, wherein each ribbon or ribbon segment of the first plurality is arranged to pass back and forth or over and under another ribbon or ribbon segment of the first plurality.

14. The filtration medium of claim 10, wherein at least one of the first or second pluralities of polymeric ribbons or ribbon segments is non-woven.

15. The filtration medium of claim 9, wherein the surface of each ribbon or ribbon segment on which is formed the first array of nanofibers is planar.

16. A filter device, comprising:
- a housing defining an inlet, an outlet, and an interior space in fluid communication with the inlet and the outlet;
- a plurality of polymeric ribbons or ribbon segments disposed within the interior space, each ribbon or ribbon segment having a surface on which is formed an array of nanofibers; and
- a plurality of baffles disposed in the interior space, the plurality of baffles defining a flow path extending from the inlet to the outlet, the flow path having a length greater than a distance between the inlet to the outlet.

17. The filter device of claim 16, wherein the array of nanofibers is configured to remove a contaminant from a fluid stream flowed from the inlet to the outlet.

\* \* \* \* \*